US011869495B2

(12) United States Patent
Kapila et al.

(10) Patent No.: US 11,869,495 B2
(45) Date of Patent: *Jan. 9, 2024

(54) VOICE TO VOICE NATURAL LANGUAGE UNDERSTANDING PROCESSING

(71) Applicant: Amazon Technologies, Inc., Seattle, WA (US)

(72) Inventors: Saiprasad Satya Kapila, Redmond, WA (US); Antonio Melis, Seattle, WA (US); Manikya Pavan Kiran Pothukuchi, Sammamish, WA (US); Steven Rabuchin, Kirkland, WA (US); Robert Pulciani, Sammamish, WA (US); Robert William Serr, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 759 days.

This patent is subject to a terminal disclaimer.

(21) Appl. No.: 16/925,045

(22) Filed: Jul. 9, 2020

(65) Prior Publication Data

US 2020/0395016 A1 Dec. 17, 2020

Related U.S. Application Data

(63) Continuation of application No. 16/007,691, filed on Jun. 13, 2018, now Pat. No. 10,720,157.

(51) Int. Cl.
*G10L 15/22* (2006.01)
*G10L 15/18* (2013.01)
*G06Q 30/0601* (2023.01)
*G10L 15/30* (2013.01)
*G10L 13/00* (2006.01)

(52) U.S. Cl.
CPC .......... *G10L 15/22* (2013.01); *G06Q 30/0621* (2013.01); *G06Q 30/0635* (2013.01); *G10L 13/00* (2013.01); *G10L 15/1815* (2013.01); *G10L 15/30* (2013.01); *G10L 15/1807* (2013.01); *G10L 2015/223* (2013.01)

(58) Field of Classification Search
None
See application file for complete search history.

(56) References Cited

U.S. PATENT DOCUMENTS 9,098,467 B1 * 8/2015 Blanksteen ............. G10L 15/22
10,567,477 B2 * 2/2020 Sumner ............... G06F 3/04842
(Continued)

*Primary Examiner* — Nafiz E Hoque
(74) *Attorney, Agent, or Firm* — Pierce Atwood LLP

(57) ABSTRACT

Techniques for providing a standardized voice user interface (VUI) that enables voice to voice natural language understanding (NLU) processing are described. The standardized VUI may be added to speechlets to enable a customer to interact with a business via server(s) using NLU processing. For example, a first user may initiate a first voice interaction using NLU processing with the server(s) and the system may initiate a second voice interaction using NLU processing between the server(s) and a second user. This enables a customer to initiate a transaction (e.g., request information, place an order, make a reservation, etc.) with the business using the speechlet. Thus, the business may use the speechlet to offer services without requiring additional infrastructure or complicated programming to implement.

18 Claims, 25 Drawing Sheets

(56) References Cited

U.S. PATENT DOCUMENTS

2014/0245140 A1\* 8/2014 Brown ............... G06Q 30/0601
715/708
2016/0155443 A1\* 6/2016 Khan ...................... G06F 3/167
704/275

\* cited by examiner

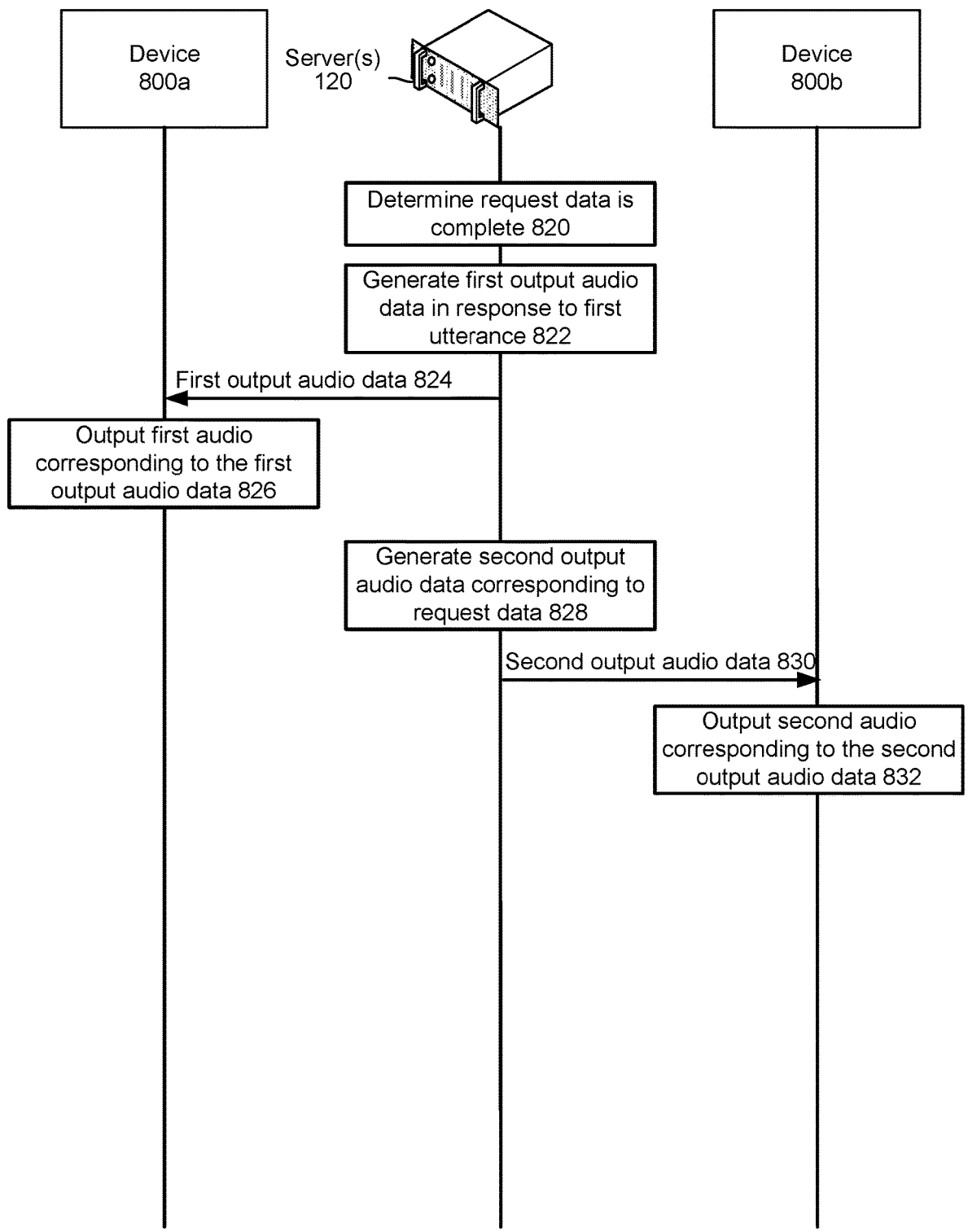

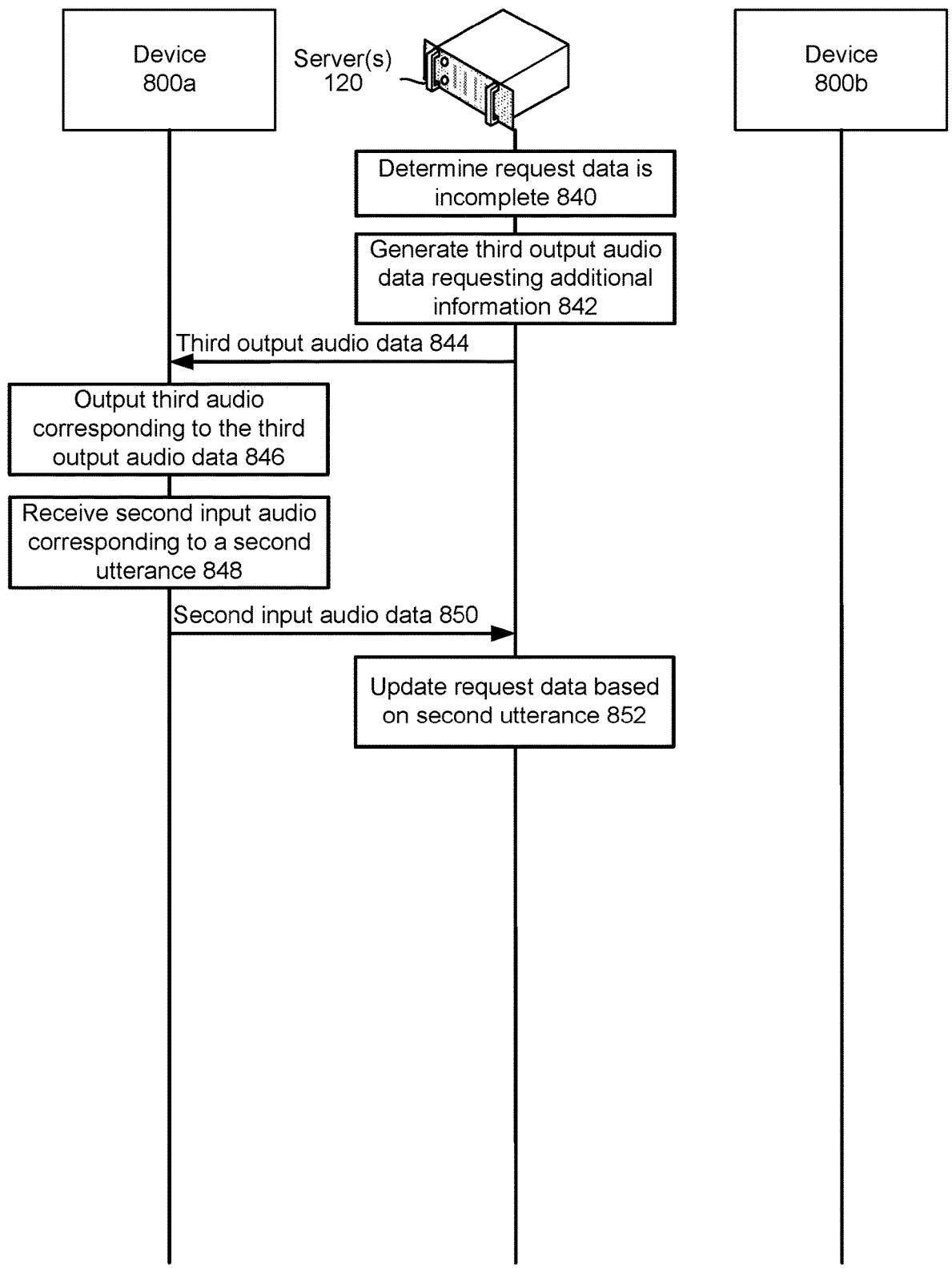

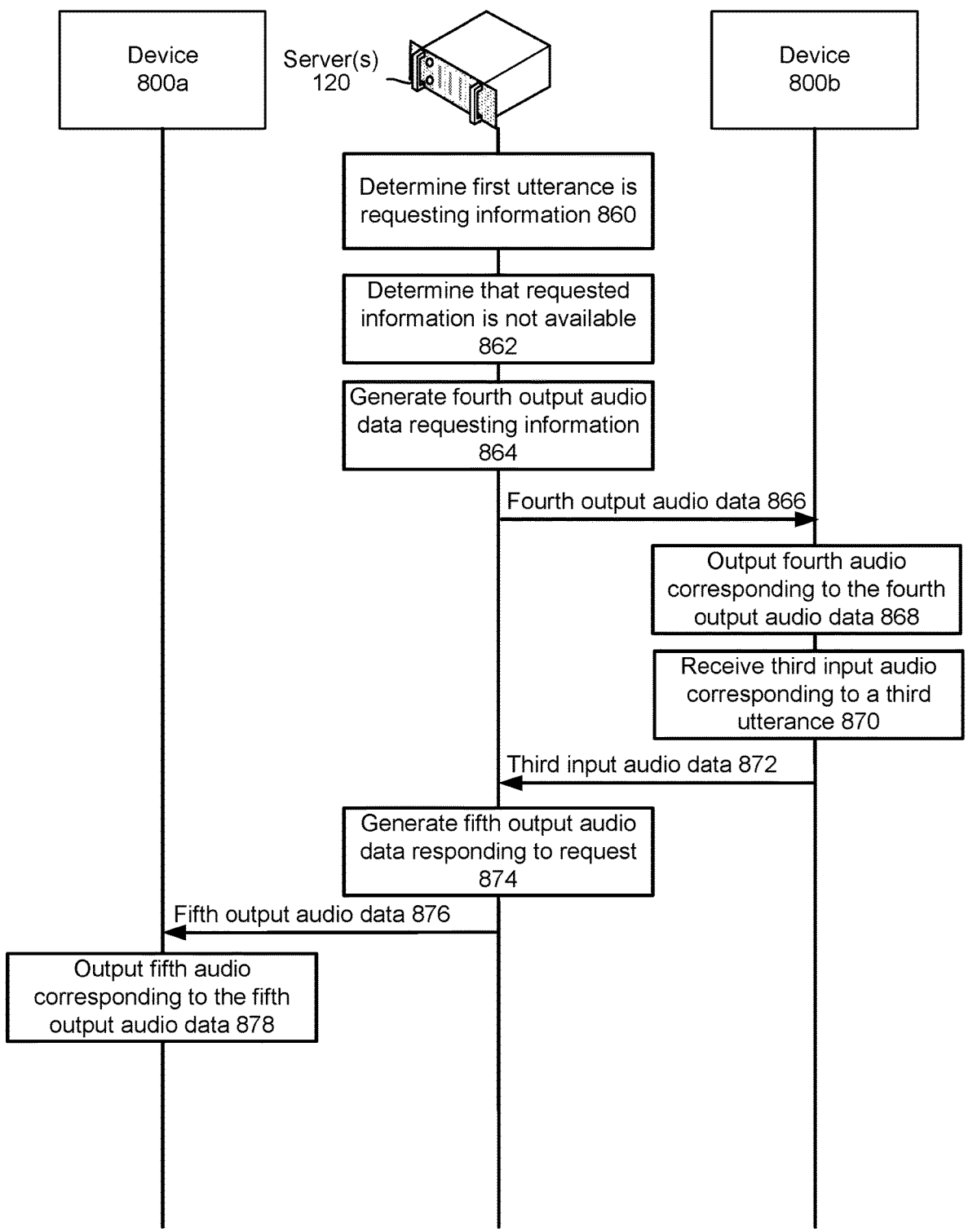

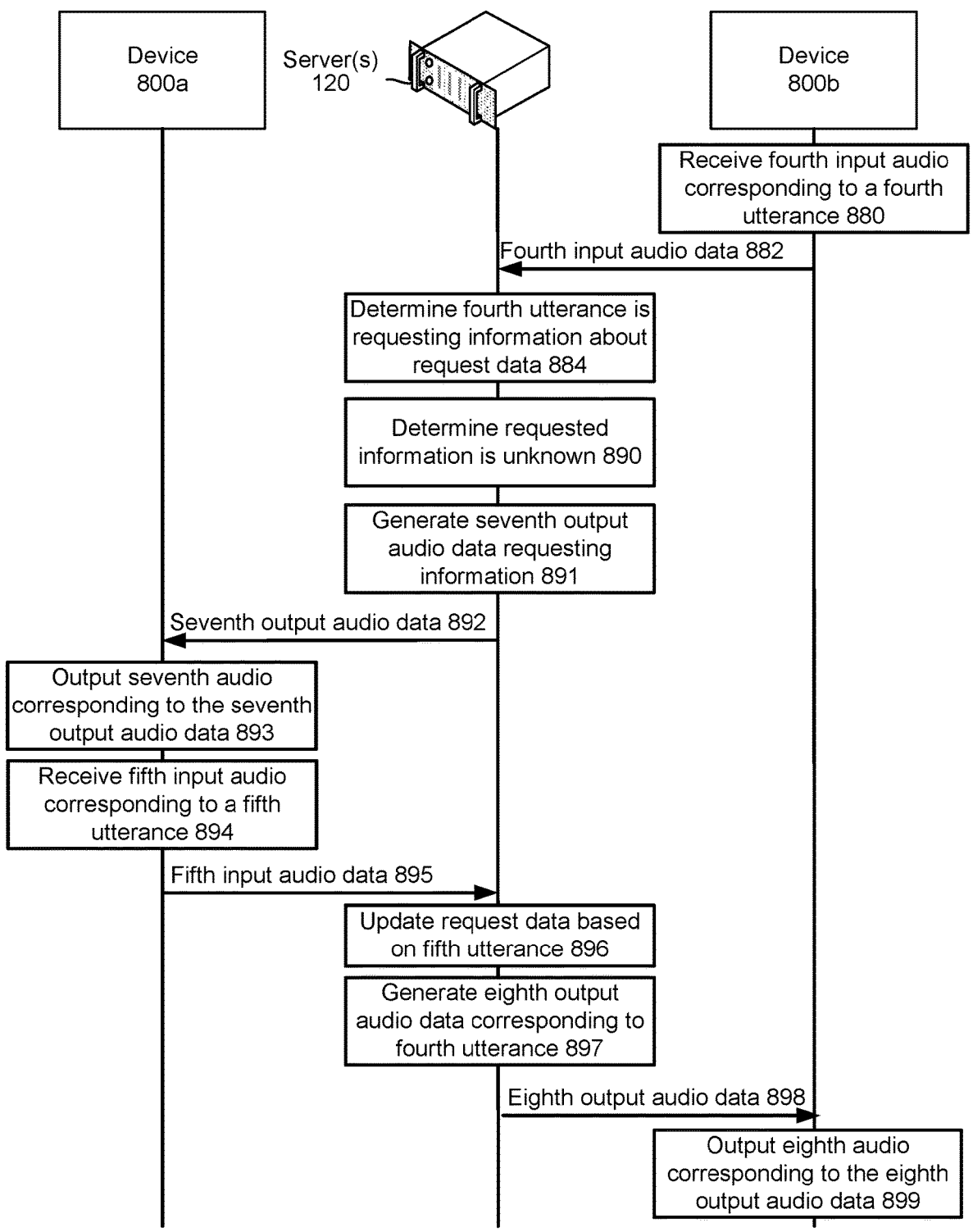

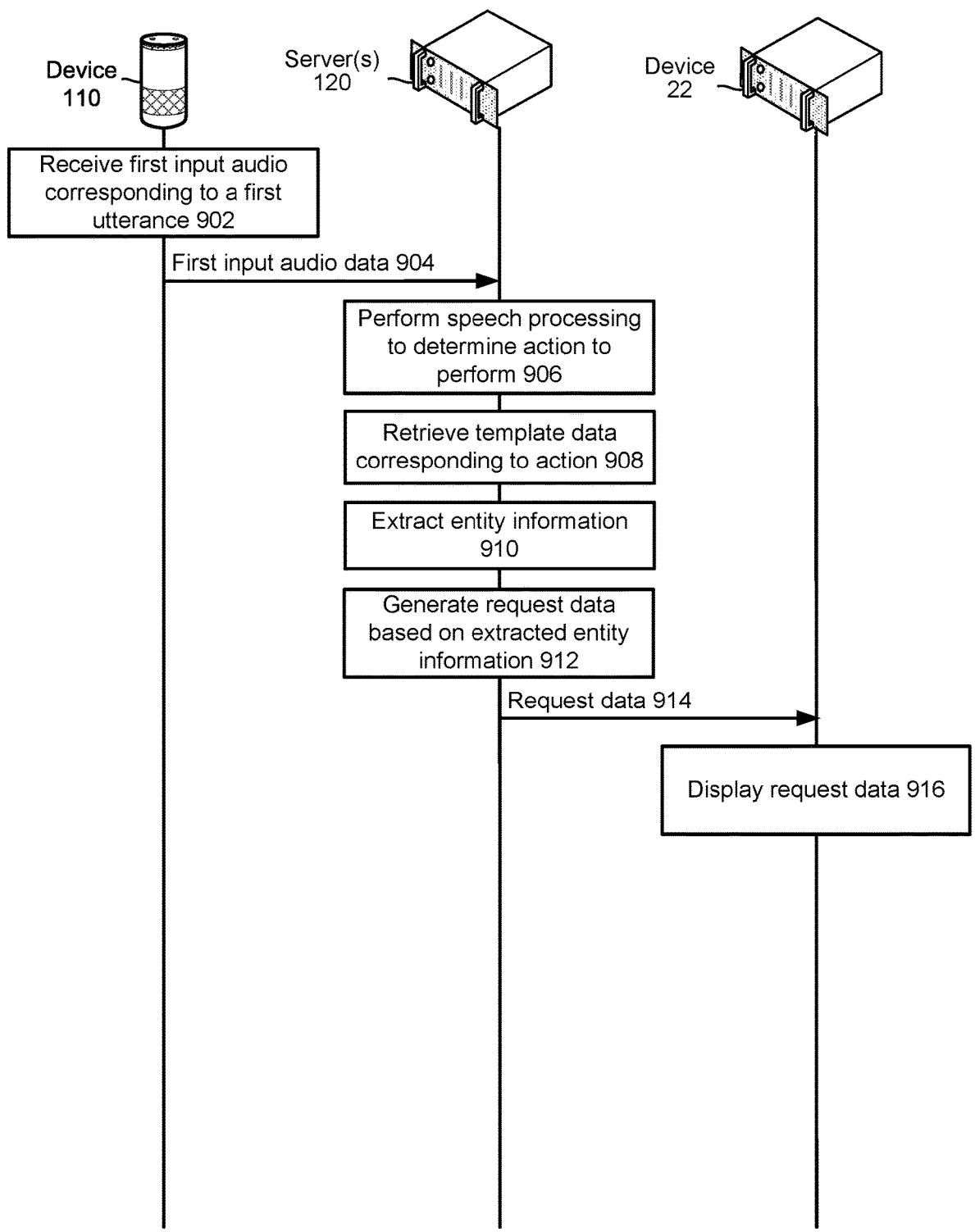

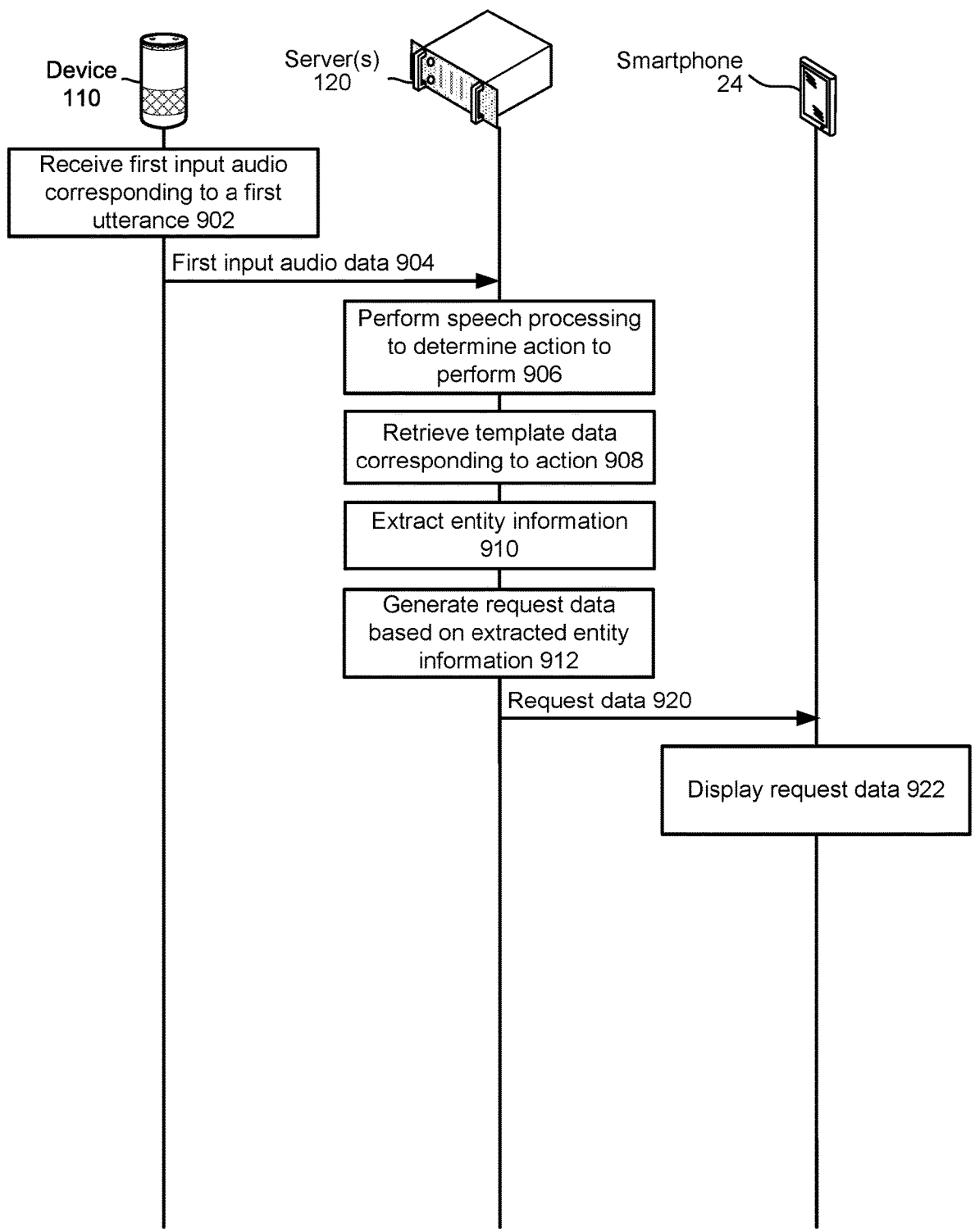

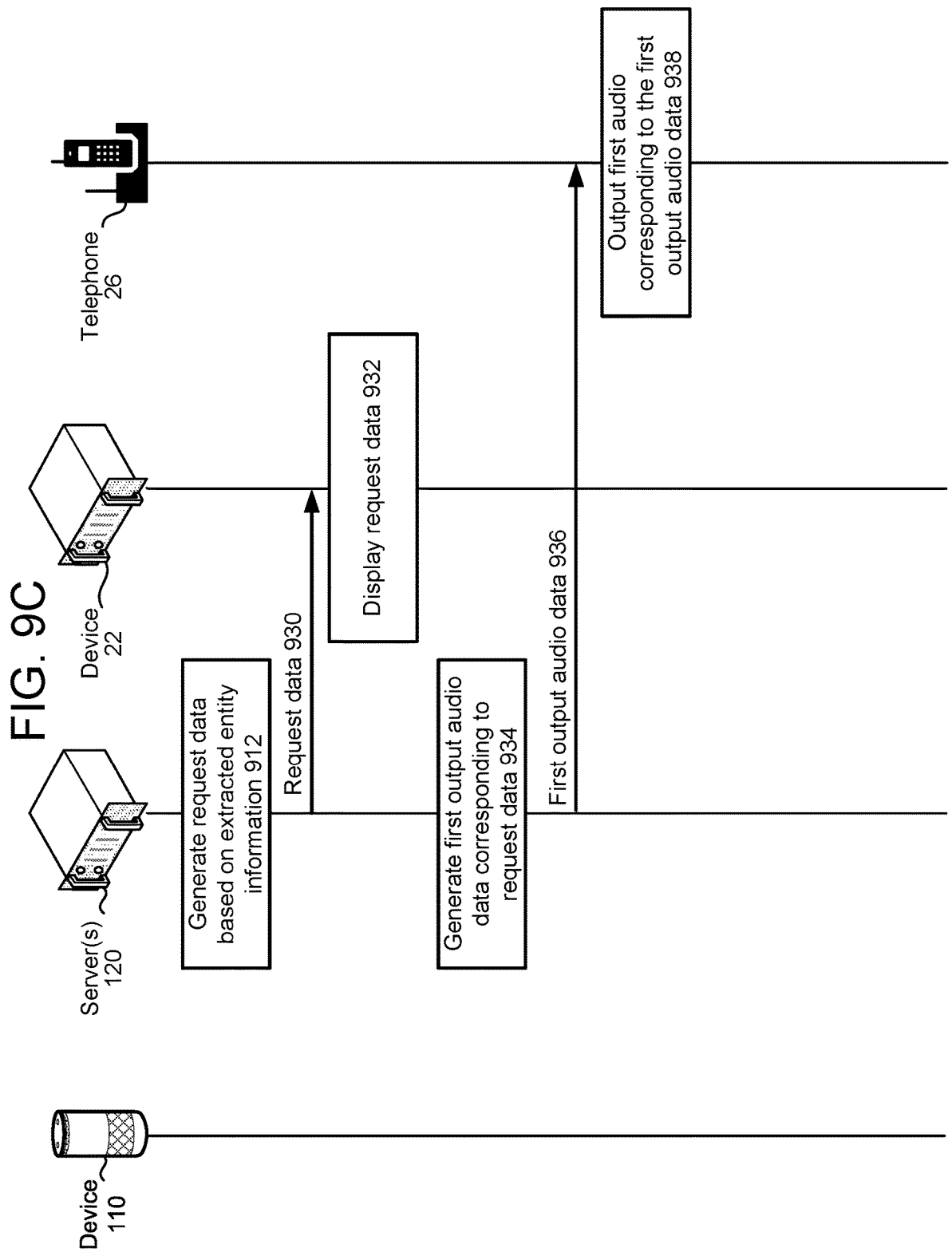

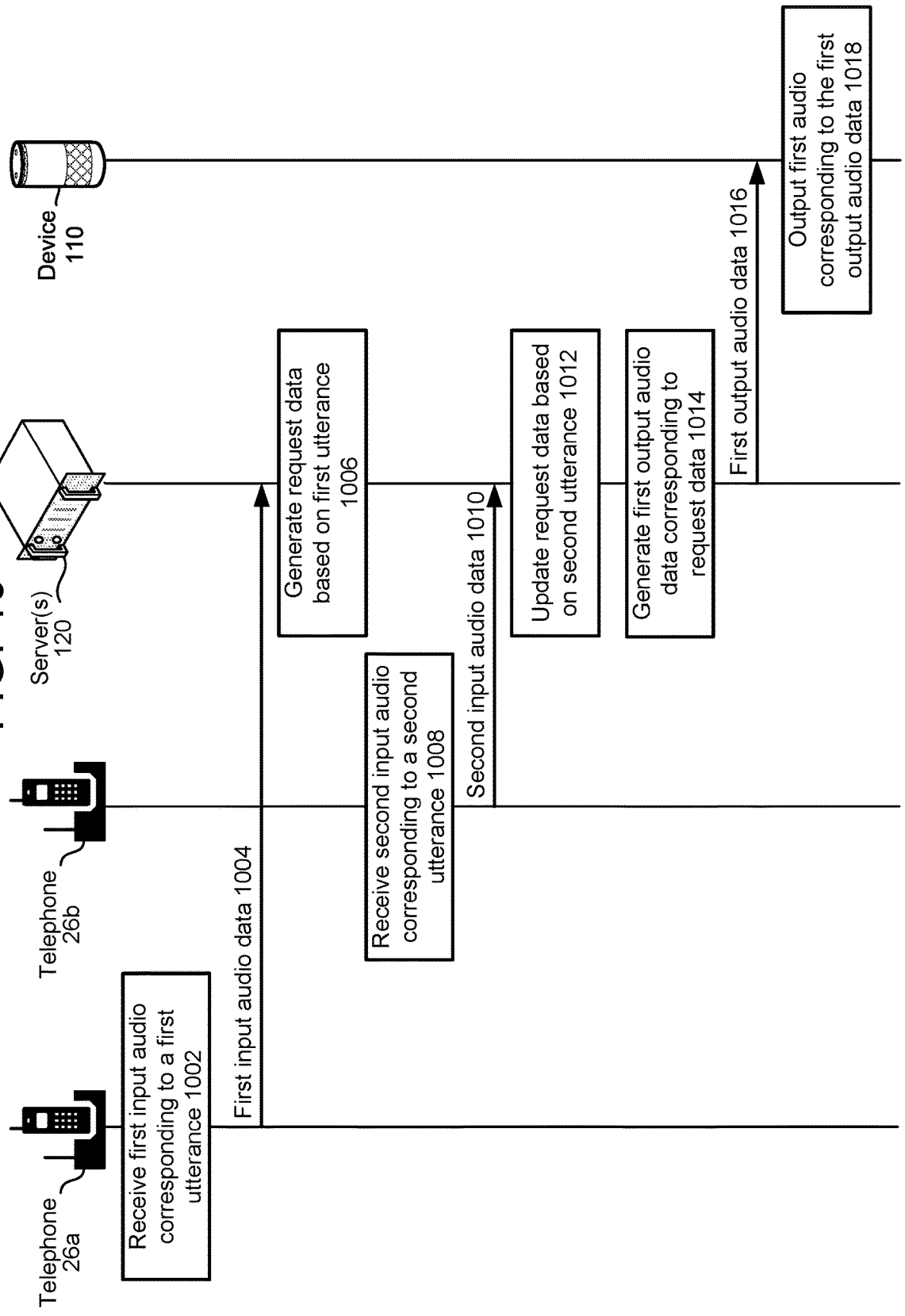

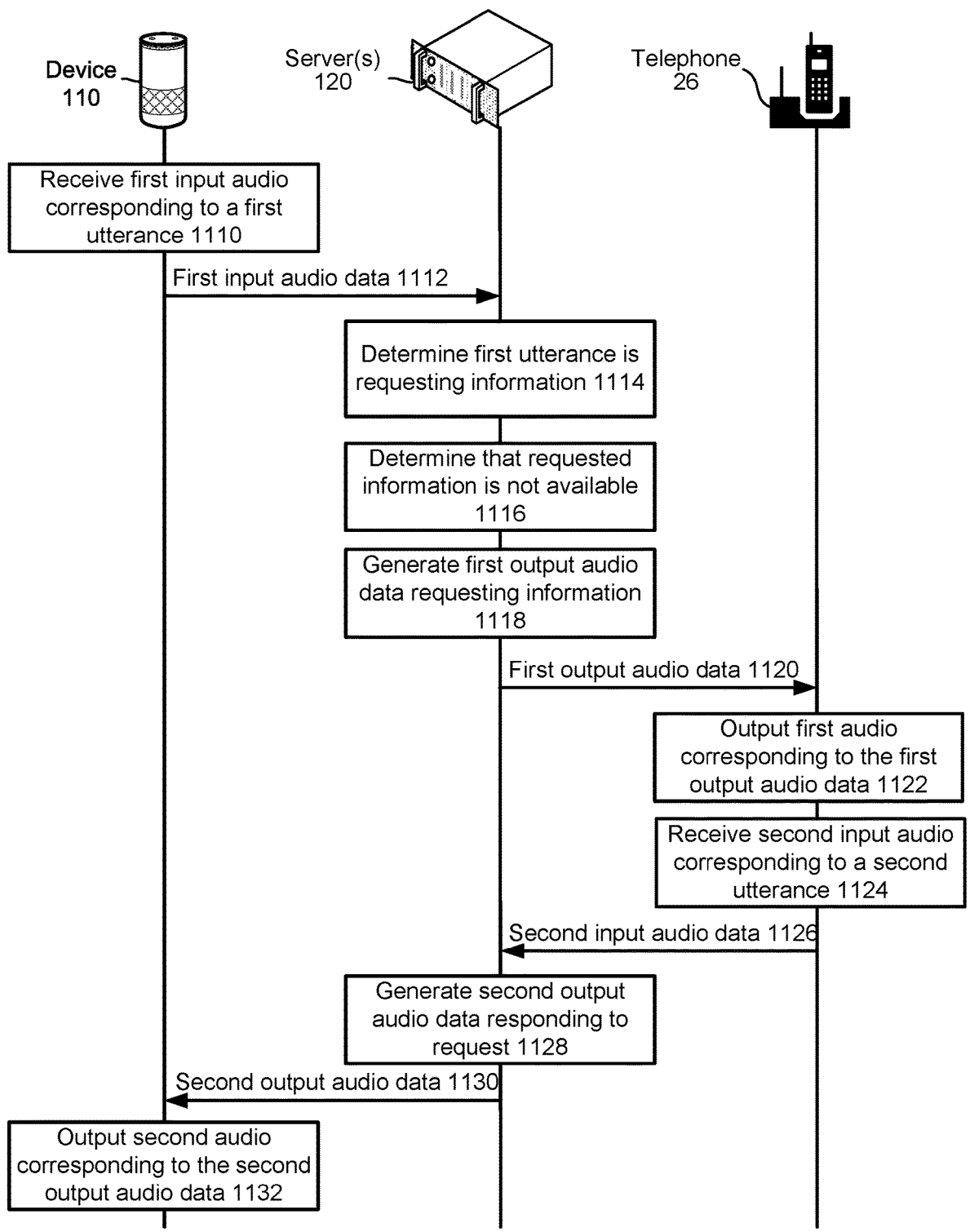

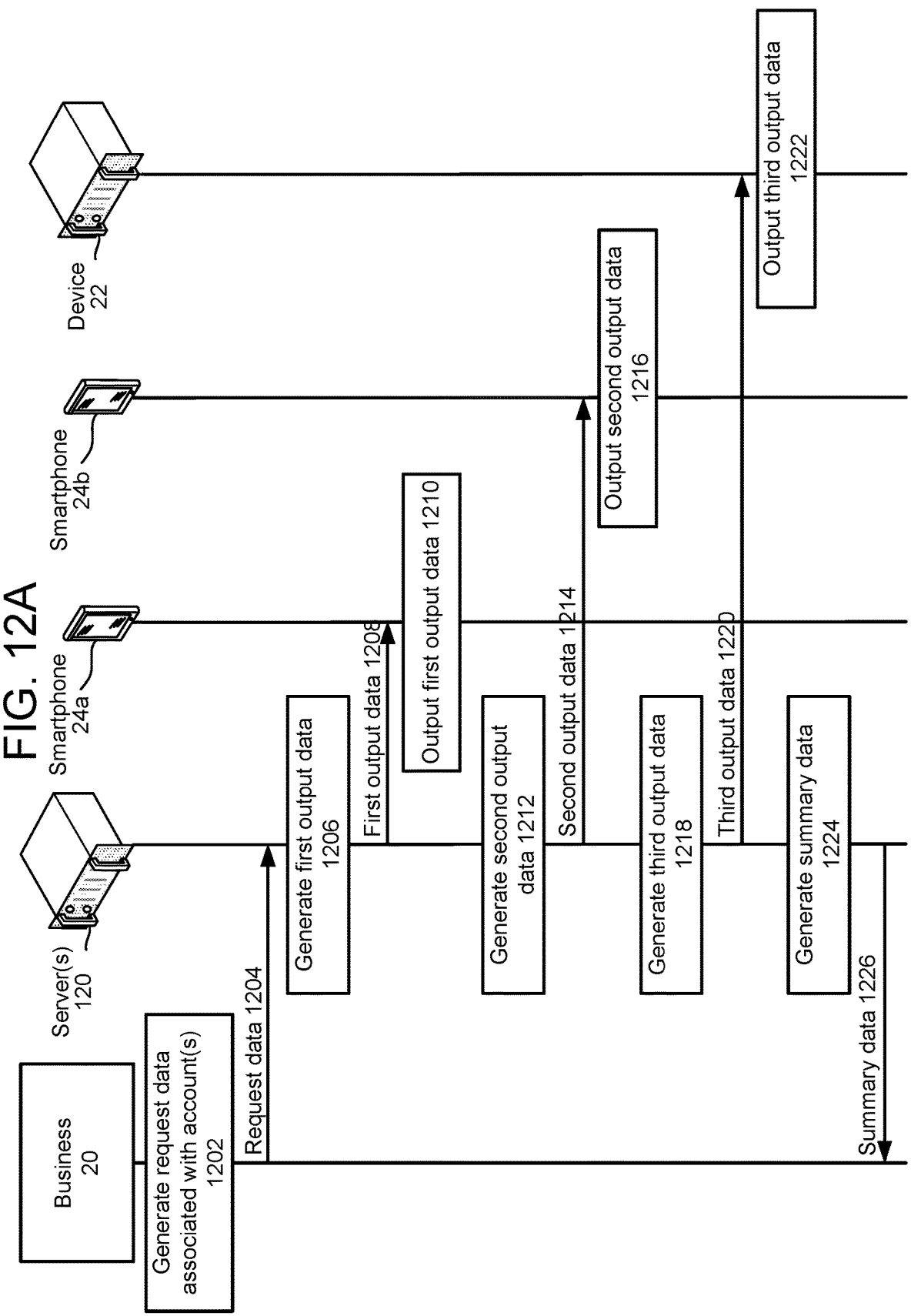

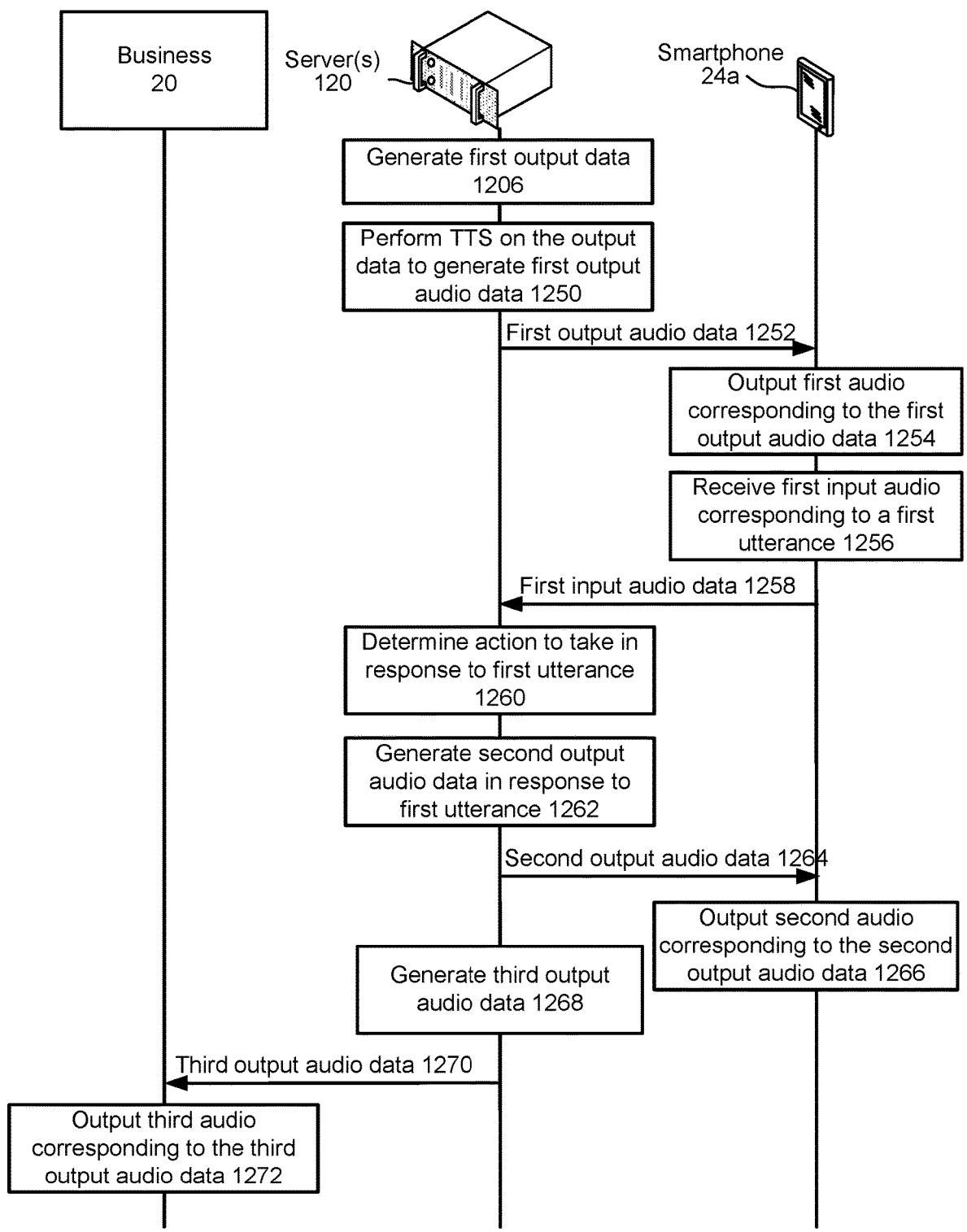

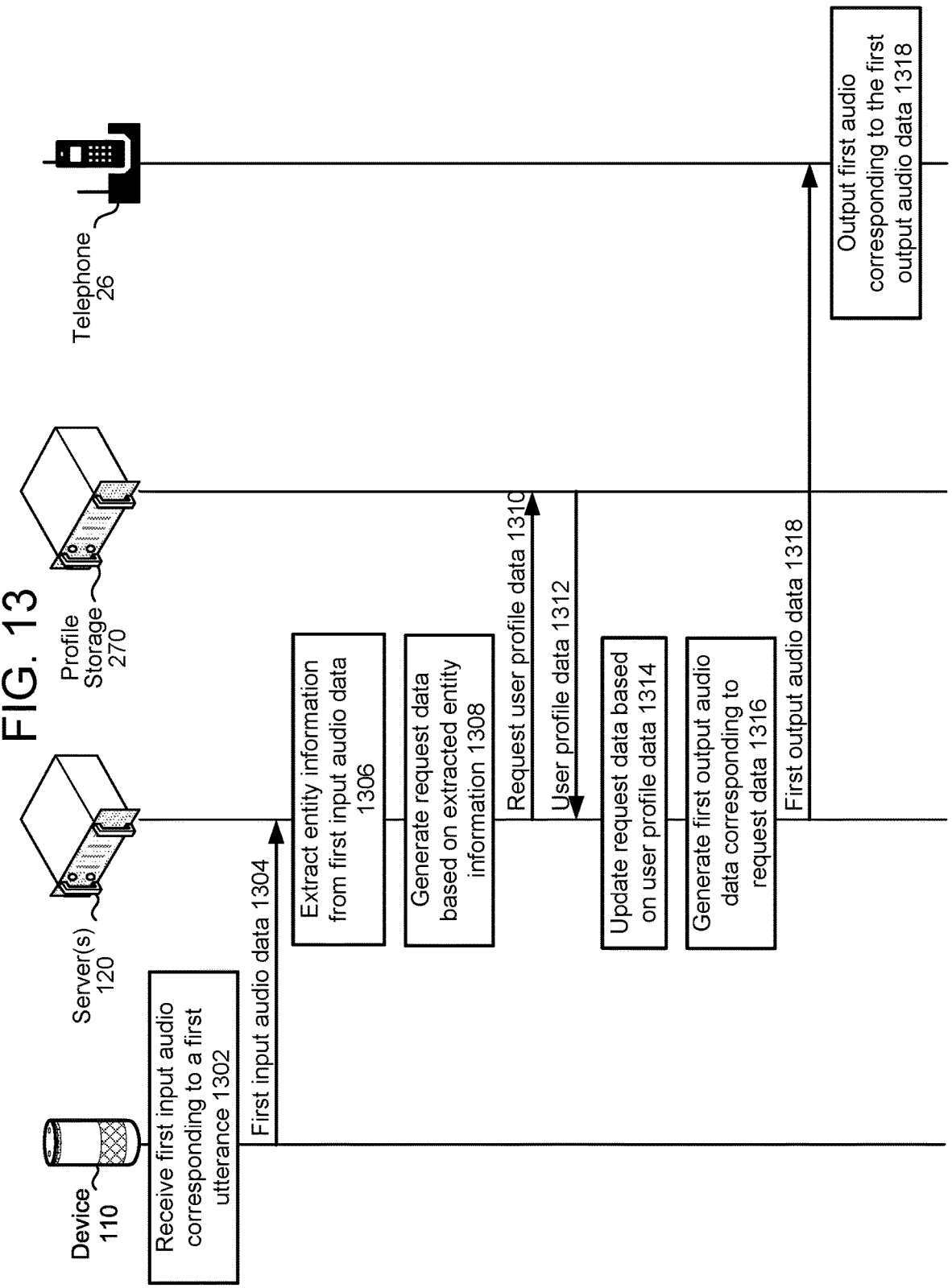

VOICE TO VOICE NATURAL LANGUAGE UNDERSTANDING PROCESSING

CROSS-REFERENCE TO RELATED APPLICATION

This application is a continuation of, and claims priority to, U.S. patent application Ser. No. 16/007,691, entitled "VOICE TO VOICE NATURAL LANGUAGE UNDERSTANDING PROCESSING," filed on Jun. 13, 2018. The above application is hereby incorporated by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition processing combined with natural language understanding processing enable speech-based user control of computing devices to perform tasks based on the user's spoken commands. The combination of speech recognition processing and natural language understanding processing techniques is referred to herein as speech processing. Speech processing may also involve converting a user's speech into text data which may then be provided to speechlets.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 8A-8F are signal flow diagrams illustrating examples of processing speech and generating output audio during multi-stage interactions with two difference accounts according to embodiments of the present disclosure.

FIGS. 9A-9D are signal flow diagrams illustrating examples of sending data to a remote device according to embodiments of the present disclosure.

FIG. 10 is a signal flow diagram illustrating an example of collating data from multiple accounts and providing a summary according to embodiments of the present disclosure.

FIG. 11 is a signal flow diagram illustrating an example of requesting information from a second account on behalf of a first account according to embodiments of the present disclosure.

FIGS. 12A-12B are signal flow diagrams illustrating examples of sending data to one or more accounts on behalf of a first account according to embodiments of the present disclosure.

FIG. 13 is a signal flow diagram illustrating an example of supplementing request data with information based on user preferences according to embodiments of the present disclosure.

DETAILED DESCRIPTION

Figure 1:
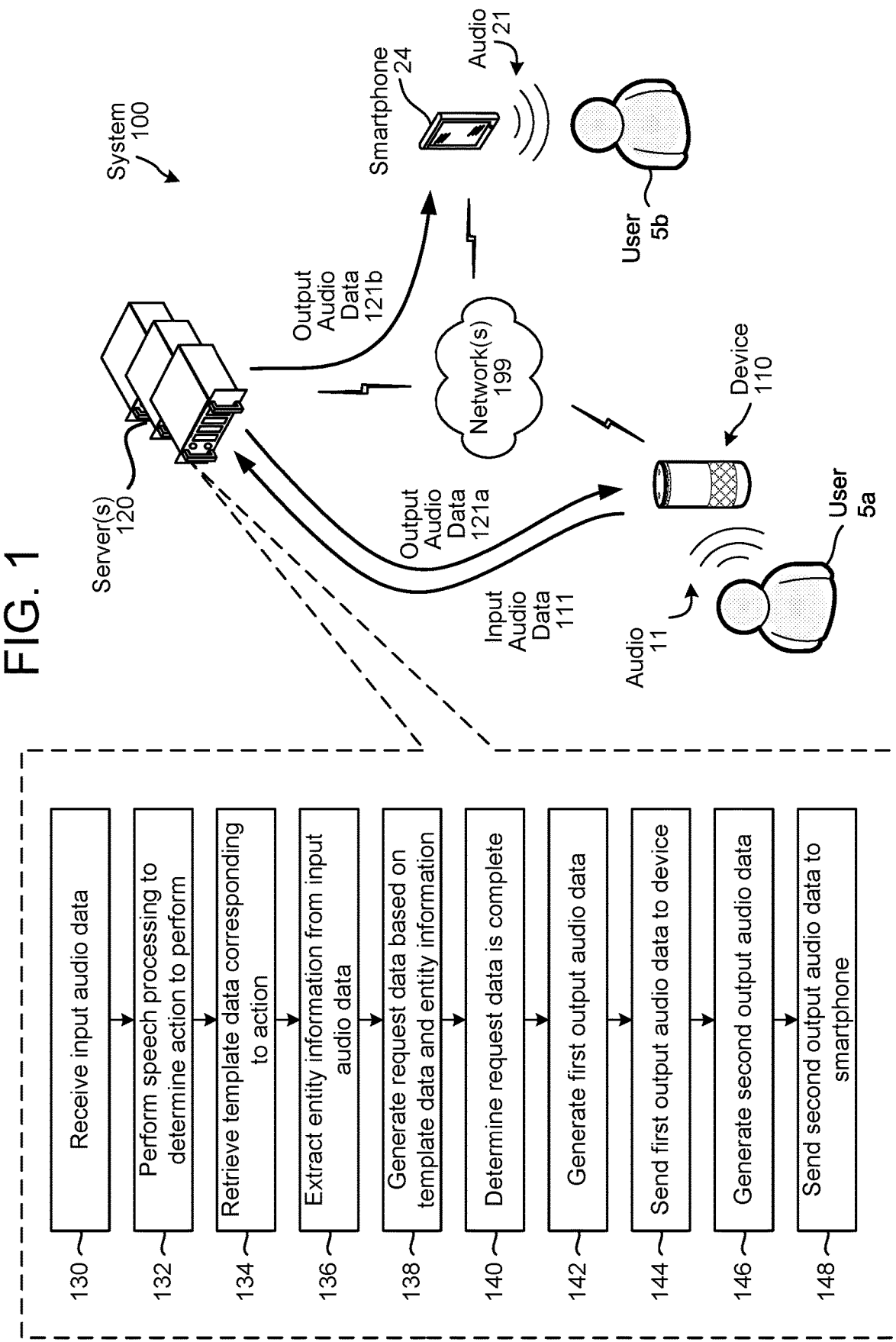
FIG. 1 illustrates a system configured to process user inputs according to embodiments of the present disclosure.

Automatic speech recognition (ASR) is a field of computer science, artificial intelligence, and linguistics concerned with transforming audio data representing speech into text data representative of that speech. Natural language understanding (NLU) is a field of computer science, artificial intelligence, and linguistics concerned with enabling computers to derive meaning from text data containing natural language. Text-to-speech (TTS) is a field of computer science, artificial intelligence, and linguistics concerned with enabling computers to output synthesized speech. ASR, NLU, and TTS may be used together as part of a speech processing system.

Certain systems implement virtual assistants. A user may speak an input to a system and the system may perform an action. For example, the system may output music, images, video, or other content responsive to the user input; may provide an answer to a question asked by the user; may interact with third party systems to cause ride sharing trips to be booked; etc.

Such systems may implement one or more speechlets (e.g., skills). Each speechlet may enable the system to perform certain functionality. For example, a weather speechlet may enable a system to provide users with weather information, a music speechlet may enable a system to output music to users, a video speechlet may enable a system to display videos to users, etc.

To provide an improved user experience or offer services to a user, a corporation or business may create a unique speechlet (e.g., skill or application) that is specific to the products/services offered by the business. For example, a pizza speechlet may enable a system to receive pizza orders directly from customers via a smartphone, without requiring the customer to call to place the order. Typically, the order is received by the business on a server using an application programming interface (API) or dynamic setup associated with the speechlet. However, developing the unique speechlet can be expensive and many businesses do not have the infrastructure to receive data using an API or dynamic setup.

To improve a user experience and provide additional functionality, systems and methods are disclosed that provide a standardized voice user interface (VUI) that may be added to speechlets without requiring customized programming or existing infrastructure (e.g., server(s) configured with an API or the like). Using the standardized VUI functionality, the system may enable speechlets that include two VUIs, such that the speechlet may include a user-directed VUI and a business-directed VUI (e.g., enabling voice to data to voice interactions). Thus, a customer may initiate a first voice interaction with the system using the user-directed VUI to place an order or request information, and the system may initiate a second voice interaction with a business using the business-directed VUI to place the order with or request the information from the business.

Thus, the system enables a business to use standardized components to easily create a speechlet that offers services such as online ordering, voice ordering, and/or the like, even when the business doesn't have existing infrastructure. For example, instead of receiving an order through a server using an API, the business may receive a telephone call from the system using existing phone lines. To place the order, the system may generate output audio data that includes synthesized speech representing the order. In addition, the system may be configured to translate and track data between the user-directed VUI and the business-directed VUI, such that the system may personalize the output audio data in a convenient format for the business.

FIG. 1 illustrates a system configured to enable voice to voice natural language understanding (NLU) processing. For example, server(s) 120 may be used as an intermediary between different users 5, enabling the server(s) 120 to perform additional functionality without requiring additional infrastructure for the users 5. Although the figures and discussion of the present disclosure illustrate certain operational steps of the system in a particular order, the steps described may be performed in a different order (as well as certain steps removed or added) without departing from the intent of the disclosure. A plurality of devices may communicate across one or more networks 199. For example, FIG. 1 illustrates an example of a device 110 local to a first user 5a communicating with the server(s) 120 and the server(s) 120 communicating with a remote device (e.g., smartphone 24) local to a second user 5b via the network(s) 199.

The server(s) 120 may be configured to enable voice to voice NLU processing (e.g., voice to data to voice interactions), acting as an intermediary between the first user 5a and the second user 5b. For example, the server(s) 120 may engage in a first voice interaction with the first user 5a to acquire information from the first user 5a and then may engage in a second voice interaction with the second user 5b to convey the acquired information to the second user 5b. Thus, the server(s) 120 may enable additional functionality to the first user 5a and/or the second user 5b, offering convenience and/or additional services that currently are not available.

Examples of services offered by the server(s) 120 include enabling a customer to make reservations at a restaurant, hotel or other business, place an order at a restaurant or other business, confirm an existing appointment, acquire information from multiple businesses, and/or the like, or enabling a business to send automated reminders or other confirmation of existing appointments, send notifications or other interactive marketing, and/or the like. Thus, the server(s) 120 may act as a go-between between a customer and a business, offloading responsibilities or providing additional resources through a voice interface. As an example, using the server(s) 120 to make an order with a restaurant may improve a user experience for the first user 5a, as the first user 5a doesn't need to wait on hold for the second user 5b to be available, and may improve an efficiency for the second user 5b, as the server(s) 120 already provided details to the first user 5a and answered questions by the first user 5a and has a completed order for the second user 5b to process.

To illustrate an example interaction in more detail, the server(s) 120 may be configured to extract and/or abstract data from the first user 5a and convey this data to the second user 5b. For example, the server(s) 120 may receive audio data corresponding to the first user 5a, may identify a voice command represented in the audio data that corresponds to a transaction, and may extract important information about the voice command. In some examples, the server(s) 120 may identify information required to perform the voice command and may ask clarification questions or follow up questions in order to acquire all of the required information. For example, if the first user 5a is placing an order at a restaurant, the server(s) 120 may identify the restaurant, retrieve menu information and ask clarification questions to ensure that the order is complete. In other examples, the server(s) 120 may provide explanations and alternatives to the first user 5a. For example, the first user 5a may ask what side dishes are available with the entrée and the server(s) 120 may indicate the normal side dishes as well as optional side dishes that result in an additional charge.

In some examples, as part of conveying the information to the second user 5b, the server(s) 120 may be configured to identify and translate first data received from the first user 5a to second data intended for the second user 5b. In a simple example, the server(s) 120 may receive an order from the first user 5a in a first sequence and may provide the order to the second user 5b in a second sequence. For example, the first user 5a may identify the menu items to order first and provide a name and address last, whereas the second user 5b may request the name and address first and the menu items to order last. Thus, the server(s) 120 may be configured to identify portions of the first data and associate them with relevant tags or categories so that the server(s) 120 may identify the portions of the first data when requested by the second user 5b. As another example, the server(s) 120 may receive an order from the first user 5a using slang or other nonconventional language and may translate the order to the precise language present in the menu. Thus, the server(s) 120 may clearly convey the order to the second user 5b using terms known to the second user 5b.

As used herein, information about the first user 5a may be stored as first user profile data (e.g., first user profile). For example, information such as a name, an address, a phone number, user preferences, and/or other information associated with the first user 5a may be stored in the user profile. Similarly, information about a particular request that is gleaned by the server(s) 120 from the first user 5a may be stored as request data. Thus, the request data may indicate what it is that the first user 5a requested (e.g., reservation, order, service, etc.) from the second user 5b, as well as any additional information concerning the request (e.g., time of reservation, name for reservation, items ordered, services requested, etc.).

If the second user 5b is an individual, the server(s) 120 may store information about the second user 5b as second user profile data (e.g., second user profile). However, if the second user 5b is associated with a business 20 for which the request is intended, the server(s) 120 may store information about the business as business profile data. In order to determine whether the request data is complete, the server(s) 120 may acquire the business profile data, which may indicate information about the business 20 as well as information that is relevant to the request data. For example, the business profile data for a restaurant may include a name and address for the restaurant, menu items available, additional information about each menu item, customization options available for each menu item, information required to place an order (e.g., template data), and/or the like. Similarly, business profile data for a hotel may include a name and address of the hotel, a description of amenities of the hotel, locations and descriptions of nearby attractions, types of rooms available at the hotel, and/or other information that may be relevant to making a reservation at the hotel. Thus, the server(s) 120 may determine a business profile (e.g., name of the business) associated with a request, may retrieve the business profile data corresponding to the business profile, and may determine whether the request data is complete (e.g., request data includes all information necessary indicated by the template data) and/or provide clarifications for the first user 5a based on the business profile data.

While the above example illustrates the request being intended for a business 20, the disclosure is not limited thereto. Instead, the request may be intended for an individual user without departing from the disclosure. Therefore, the template data used to determine whether the request data is complete may be stored in user profile data without departing the disclosure. For ease of illustration, the following description may refer to "business profile data" to indicate information that is relevant to the request data, including template data, but the disclosure is not limited thereto and "user profile data" may be substituted without departing from the disclosure.

While FIG. 1 illustrates the server(s) 120 communicating with the device 110 and/or the smartphone 24 via the network(s) 199 (e.g., a data network), the disclosure is not limited thereto and the server(s) 120 may communicate with devices using any techniques known to one of skill in the art. Thus, the server(s) 120 may communicate with the device 110, the smartphone 24, and/or other devices via the network(s) 199, other networks (e.g., a public switched telephone network (PSTN), a wireless service provider, a WiFi or a cellular network, and/or the like), and/or a combination thereof without departing from the disclosure. For example, the server(s) 120 may communicate with a device 22 via the data network(s) 199, communicate with the smartphone 24 via a combination of the data network(s) 199 and/or the cellular network connection, and communicate with a telephone 26 via a combination of the data network(s) 199 and/or the PSTN using an adapter.

As used herein, the device 110 represents any device that is associated with the server(s) 120, such as a device that uses the server(s) 120 to interpret voice commands, perform other functionality, and/or the like. Thus, while FIG. 1 illustrates the device 110 as a speech enabled device, the disclosure is not limited thereto and the device 110 may be a computer, a tablet, a smartphone, a television, and/or any other device that is associated with the server(s) 120 and/or an account that is associated with the server(s) 120. In contrast, a remote device that is not associated with the server(s) 120 may be referred to as a device 22 (e.g., remote device that communicates with the server(s) 120 via the data network(s) 199), a smartphone 24 (e.g., remote device that communicates with the server(s) 120 via a combination of the data network(s) 199 and/or the cellular network connection), and/or a telephone 26 (e.g., remote device that communicate with the server(s) 120 via a combination of the data network(s) 199 and/or the PSTN using an adapter). The device 22, the smartphone 24 and/or the telephone 26 may be associated with a business 20, although the disclosure is not limited thereto and a user 5 (e.g., a customer of the business 20) may communicate with the server(s) 120 via the device 22, the smartphone 24 and/or the telephone 26 without departing from the disclosure.

As illustrated in FIG. 1, the first user 5a may generate audio 11 (e.g., an utterance) and the device 110 may capture the audio 11 as input audio data 111, which the device 110 may send to the server(s) 120. The server(s) 120 may process the input audio data 111 and generate first output audio data 121a as a response to the first user 5a. For example, the input audio data 111 may correspond to a voice command to order a pizza (e.g., "Alexa, please order a large pepperoni pizza") and the first output audio data 121a may correspond to confirmation that the voice command was received (e.g., "Okay, I will order a large pepperoni pizza."). In addition, the server(s) 120 may also generate second output audio data 121b and send the second output audio data 121b to the second user 5b to place the order. For example, the second output audio data 121b may include text-to-speech (TTS) that corresponds to the pizza order (e.g., "I would like to place an order for a large pepperoni pizza").

While not illustrated in FIG. 1, there may be additional dialog between the server(s) 120 and the second user 5b, as the second user 5b may ask additional questions (e.g., "Will that complete your order?"), request clarification of the order (e.g., "Would you like the 18" round large pizza or a rectangular sheet pizza?"), request additional details about the order (e.g., "What is the delivery address?"), provide confirmation of the order (e.g., "That will be ready in 15 minutes"), and/or the like. The server(s) 120 may receive additional input audio data from the smartphone 24, perform speech processing to understand the query, and generate additional output audio data to respond. Additionally or alternatively, there may be additional dialog between the server(s) 120 and the first user 5a, occurring while taking the order (e.g., "Would you like anything else?") and/or after the order is placed (e.g., "The order was placed and should be ready in 15 minutes."). Similarly, the server(s) 120 may receive additional input audio data from the device 110, perform speech processing to understand the query, update the order information, and/or generate additional output audio data to respond.

Thus, while FIG. 1 only illustrates a simple interaction between the first user 5a and the server(s) 120 and between the server(s) 120 and the second user 5b, the disclosure is not limited thereto. Instead, the server(s) 120 may be configured for extended interactions with the user 5, generating follow up questions and/or explanations in order to acquire and/or convey as much information as needed to generate the request data from the first user 5a and/or to convey the request data to the second user 5b.

As illustrated in FIG. 1, the server(s) 120 may receive (130) input audio data from the device 110 and may perform (132) speech processing to determine an action to perform. For example, the first user 5a may provide the device 110 with user input corresponding to speech of the first user 5a (e.g., an utterance). The device 110 may generate the input audio data 111 representing the speech and send the input audio data 111 to the server(s) 120. The server(s) 120 may perform automatic speech recognition (ASR) processing on the input audio data 111 to generate first text data and may perform natural language understanding (NLU) processing on the first text data to determine an intent of the first user 5a and identify the action to perform.

After determining the action to perform, the server(s) 120 may retrieve (134) template data corresponding to the action and may extract (136) entity information from the input audio data 111. The template data may indicate all information required to complete the action and may be included in business profile data. For example, the server(s) 120 may determine that the action corresponds to ordering from a restaurant, may identify the restaurant, and may retrieve template data and/or business profile data corresponding to the selected restaurant. Based on the template data, the server(s) 120 may identify what information is required to place the order and may extract the required information (e.g., entity information) from the first text data associated with the input audio data 111 and/or request additional information from the first user 5*a*.

The server(s) 120 may generate (138) request data based on the template data and the entity information extracted from the first text and/or subsequent input audio data. The request data may include all details indicated by the input audio data 111 regarding the particular request. For example, if the input audio data 111 corresponds to placing an order at a restaurant, the request data may indicate a quantity and precise description of each menu item to order, along with customization options (e.g., modifications from the menu, specific side dishes, etc.) and any other details required to place the order. As another example, if the input audio data 111 corresponds to placing a reservation at a hotel, the request data may indicate a quantity and type of hotel room to reserve, along with specific dates, number of occupants, and/or other information required to reserve the hotel rooms. In addition, the request data may include information associated with the first user 5*a*, such as a name, address, phone number, and/or the like that may be used to place the order and/or make the reservation.

The server(s) 120 may determine (140) that the request data is complete. For example, the server(s) 120 may compare the request data to the template data and determine that all information required to process the request that is indicated by the template data is present. To illustrate a first example that occurs when the input audio data 111 corresponds to placing an order at a restaurant, the server(s) 120 may determine that the request data is complete when the request data includes at least one menu item, a name, an address (e.g., if delivery is requested), a phone number, and/or any other information required to place the order. To illustrate a second example that occurs when the input audio data 111 corresponds to making a reservation at a hotel, the server(s) 120 may determine that the request data is complete when the request data includes at least a quantity of hotel rooms to reserve, specific dates for which to reserve the hotel rooms, a name, and/or any other information that may be used to make the reservation.

The template data may only indicate a minimum amount of information necessary to process the request. Therefore, while not explicitly illustrated in FIG. 1, in some examples the server(s) 120 may request explicit confirmation from the first user 5*a* that the request data is complete. For example, the server(s) 120 may generate output audio data corresponding to synthesized speech (e.g., "Will that complete your order?") and receive input from the first user 5*a* (e.g., input audio data, although the disclosure is not limited thereto) that the request data is complete.

After determining that the request data is complete, the server(s) 120 may generate (142) first output audio data 121*a* indicating the action being performed (e.g., synthesized speech corresponding to "Okay, I will order from <Restaurant>") and may send (144) the first output audio data 121*a* to the device 110 to be output to the first user 5*a*. In the example illustrated in FIG. 1, the first user 5*a* may correspond to a customer and the second user 5*b* may be associated with a business 20 to which the first user 5*a* is placing an order or making a reservation.

The server(s) 120 may also generate (146) second output audio data 121*b* based on the request data and may send (148) the second output audio data 121*b* to the smartphone 24 to be output to the second user 5*b* associated with the business 20. For example, the second output audio data 121*b* may correspond to a listing of the request data (e.g., synthesized speech corresponding to an entire order to be placed at the restaurant), a portion of the request data (e.g., synthesized speech corresponding to a single menu item from the order at a time, based on feedback from the second user 5*b*), a notification of incoming request data (e.g., synthesized speech indicating an identification number associated with the request data, which the server(s) 120 may send directly to the smartphone 24 and/or other devices via the network(s) 199), and/or the like.

While not explicitly illustrated in FIG. 1, in some examples the server(s) 120 may have an extended interaction with the second user 5*b*. For example, the server(s) 120 may send the second output audio data 121*b* to the second user 5*b*, receive input audio data from the second user 5*b*, send additional output audio data to the second user 5*b*, and so on. Thus, the server(s) 120 may communicate directly with the second user 5*b* in a back and forth conversation, providing portions of the request data as prompted by the second user 5*b*. For example, the second user 5*b* may walk through an order one menu item at a time and the server(s) 120 may be configured to identify a relevant portion of the request data and generate output audio data indicating the requested menu item. Additionally or alternatively, the second user 5*b* may request clarification about the order and the server(s) 120 may be configured to respond to the request and provide additional information.

In the example illustrated in FIG. 1, the first user 5*a* initiates a transaction with the second user 5*b*. While the transaction may correspond to placing an order at a restaurant or making a reservation at a hotel, as described in the examples above, the disclosure is not limited thereto and the request data may correspond to any information that may be processed by the server(s) 120 and sent to the first user 5*a* and/or the second user 5*b*. For example, the first user 5*a* may place an order, make a hotel reservation, request information about services or products, request information about availability, and/or the like without departing from the disclosure. While FIG. 1 illustrates a customer-initiated interaction, the disclosure is not limited thereto and the second user 5*b* may start a business-initiated interaction without departing from the disclosure. For example, the second user 5*b* may respond to a request for information from the first user 5*a*, may schedule and/or confirm appointments or meetings, may send reminders to the first user 5*a*, may advertise or provide quotes for services, and/or the like.

Figure 2:
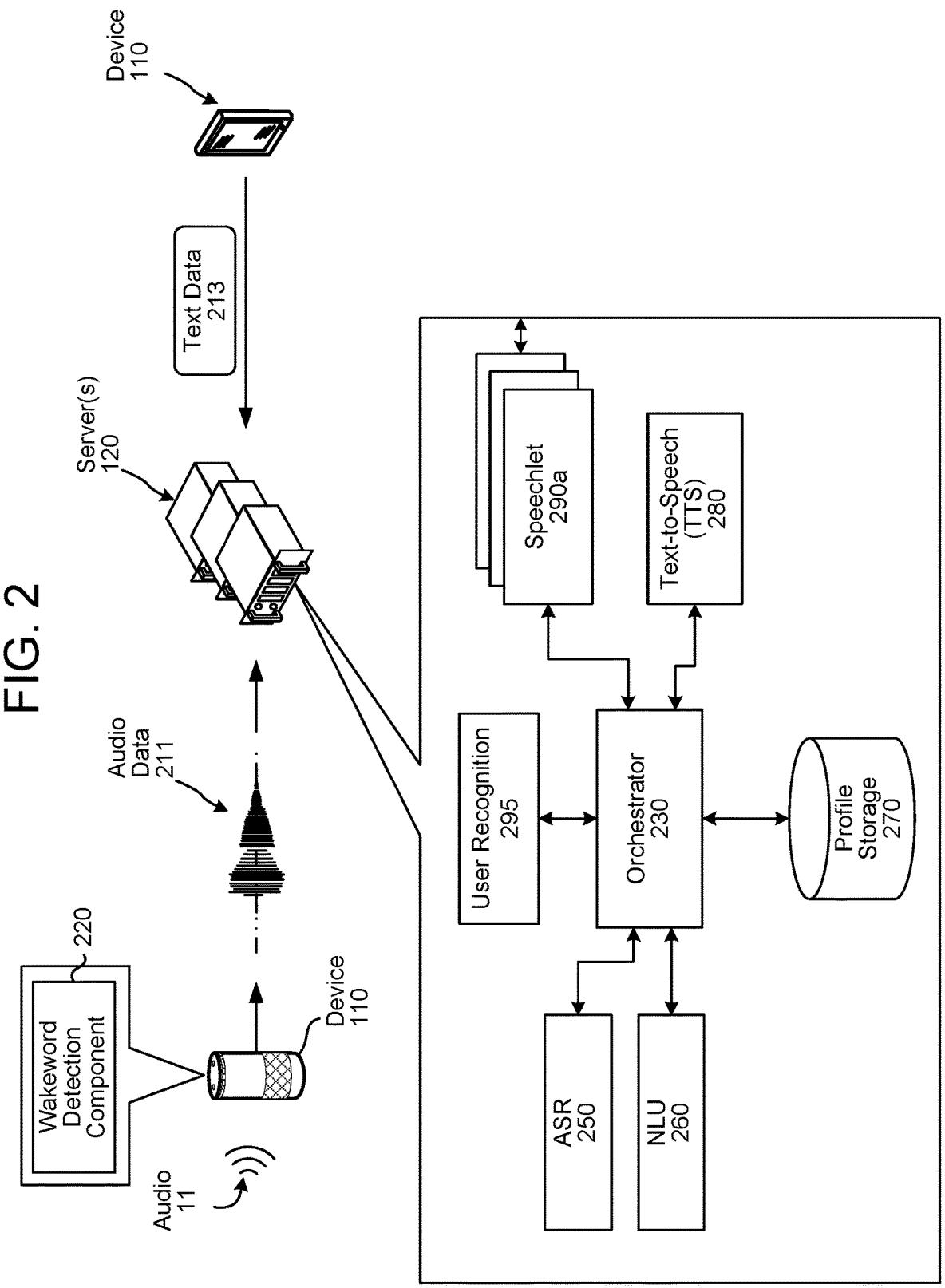
FIG. 2 is a conceptual diagram of components of a system according to embodiments of the present disclosure.

The system may operate using various components as described in FIG. 2. The various components may be located on same or different physical devices. Communication between various components may occur directly or across a network(s) 199.

An audio capture component(s), such as a microphone or array of microphones of the device 110, captures audio 11. The device 110 processes audio data, representing the audio 11, to determine whether speech is detected. The device 110 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. This process may also be referred to as keyword detection, with a wakeword being a specific example of a keyword. An example wakeword is "Alexa."

Wakeword detection is typically performed without performing linguistic analysis, textual analysis, or semantic analysis. Instead, the audio data representing the audio 11 is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the server(s) 120. The audio data 211 may include data corresponding to the wakeword, or the portion of the audio data 211 corresponding to the wakeword may be removed by the device 110 prior to sending the audio data 211 to the server(s) 120.

Upon receipt by the server(s) 120, the audio data 211 may be sent to an orchestrator component 230. The orchestrator component 230 may include memory and logic that enables the orchestrator component 230 to transmit various pieces and forms of data to various components of the system, as well as perform other operations.

The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, either directly or via the orchestrator component 230. The text data sent from the ASR component 250 to the NLU component 260 may include a top scoring hypothesis or may include an N-best list including multiple hypotheses. An N-best list may additionally include a respective score associated with each hypothesis represented therein. Each score may indicate a confidence of ASR processing performed to generate the hypothesis with which the score is associated.

Alternatively, the device 110 may send text data 213 to the server(s) 120. Upon receipt by the server(s) 120, the text data 213 may be sent to the orchestrator component 230. The orchestrator component 230 may send the text data 213 to the NLU component 260.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent representing an action that a user desires be performed as well as pieces of the input text data that allow a device (e.g., a device 110, the server(s) 120, etc.) to execute the intent. For example, if the text data corresponds to "call John," the NLU component 260 may determine an intent that the system establish a two-way communication channel between the device 110 originating the call and a device of the recipient "John."

The NLU component 260 outputs NLU results to the orchestrator component 230. The NLU results may include a representation of a single intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value. The orchestrator component 230 may send the NLU results to an associated speechlet component 290. If the NLU results include multiple NLU hypotheses, the orchestrator component 230 may send a portion of the NLU results corresponding to the top scoring NLU hypothesis to a speechlet component 290 associated with the top scoring NLU hypothesis.

A "speechlet" or "speechlet component" may be software running on the server(s) 120 that is akin to a software application running on a traditional computing device. That is, a speechlet component 290 may enable the server(s) 120 to execute specific functionality in order to perform one or more actions (e.g., provide information to a user, display content to a user, output music, or perform some other requested action). The server(s) 120 may be configured with more than one speechlet component 290. For example, a weather speechlet component may enable the server(s) 120 to provide weather information, a ride sharing speechlet component may enable the server(s) 120 to schedule a trip with respect to a ride sharing service, a restaurant speechlet component may enable the server(s) 120 to order a pizza with respect to a restaurant's online ordering system, a communications speechlet component may enable the system to perform messaging or multi-endpoint communications, a device-specific speechlet may enable the system to perform one or more actions specific to the device 110, etc. A speechlet component 290 may operate in conjunction between the server(s) 120 and other devices such as a device 110 local to a user in order to complete certain functions. Inputs to a speechlet component 290 may come from various interactions and input sources.

The functionality described herein as a speechlet or speechlet component may be referred to using many different terms, such as an action, bot, app, or the like.

A speechlet component 290 may include hardware, software, firmware, or the like that may be dedicated to the particular speechlet component 290 or shared among different speechlet components 290. A speechlet component 290 may be part of the server(s) 120 (as illustrated in FIG. 2) or may be located at whole (or in part) with one or more separate servers.

Unless expressly stated otherwise, reference to a speechlet, speechlet device, or speechlet component may include a speechlet component operating within the server(s) 120 (for example as speechlet component 290) and/or speechlet component operating within a server(s) separate from the server(s) 120.

A speechlet component 290 may be configured to perform one or more actions. An ability to perform such action(s) may sometimes be referred to as a "skill." That is, a skill may enable a speechlet component 290 to execute specific functionality in order to provide data or produce some other output requested by a user. A particular speechlet component 290 may be configured to execute more than one skill. For example, a weather skill may involve a weather speechlet component providing weather information to the server(s) 120, a ride sharing skill may involve a ride sharing speechlet component scheduling a trip with respect to a ride sharing service, an order pizza skill may involve a restaurant speechlet component ordering a pizza with respect to a restaurant's online ordering system, a windows control skill may involve a device-specific speechlet component causing a vehicle to move its windows, etc.

A speechlet component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, device-specific skills, as well as custom skills that are not associated with any pre-configured type of skill.

In some examples, the system may be configured with different device-specific speechlet components (illustrated as part of the speechlet components 290 in FIG. 2). A device-specific speechlet component may be specific to a vehicle manufacturer, an appliance manufacturer, or some other device manufacturer that does not control or maintain the server(s) 120.

A user profile may be configured with top-level speechlets. Thus, a user may invoke a top-level speechlet without explicitly referring to the speechlet in the user input. For example, a weather speechlet may be a top-level speechlet. A user may say "Alexa, what is the weather." In response, the system may call the weather speechlet to provide weather information, even though the user did not explicitly refer to the weather speechlet in the user input.

A user profile may also be configured with non-top-level speechlets. Thus, a user may need to explicitly refer to a non-top-level speechlet in a user input in order to cause the system to call the particular non-top-level speechlet to perform an action responsive to the user input. For example, the system may be configured with a top-level weather speechlet and a non-top-level Weather Underground speechlet. To cause the non-top-level Weather Underground speechlet to be called instead of the top-level weather speechlet, a user may need to explicitly refer to the non-top-level Weather Underground speechlet in the user input, for example by saying "Alexa, ask Weather Underground what is the weather for tomorrow."

In certain instances, the server(s) 120 may receive or determine text data responsive to a user input, when it may be more appropriate for audio to be output to a user. The server(s) 120 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The server(s) 120 may include profile storage 270. The profile storage 270 may include a variety of information related to individual users, groups of users, etc. that interact with the system. The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles. Each group profile may be associated with a different group identifier. A group profile may be an umbrella profile specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a single group profile may additionally include preferences specific to the user associated therewith. That is, each user profile may include preferences unique from one or more other user profiles associated with the same group profile. A user profile may be a stand-alone profile or may be associated with a group profile.

A user profile may represent speechlet components enabled by the user associated with the user profile. The system may be configured such that certain speechlet components may not be invoked by a user's input unless the user has enabled the speechlet component. The system may automatically enable a device-specific speechlet component with respect to a user profile when the user associates a device, associated with the device-specific speechlet component, with the user's profile. For example, if the user associates a vehicle with their user profile, the system may enable the vehicle manufacturer's speechlet component without a particular user request to do so. The system may hide a device-specific speechlet component from a user until the user has associated a device (associated with the device-specific speechlet component) with their user profile. This is because device-specific speechlet components may be configured to only provide functionality useful to users having devices associated with the device-specific speechlet components. For example, a particular vehicle manufacturer's speechlet component may only provide functionality useful to a user having one or more of the vehicle manufacturer's vehicles.

When a user associates a device with their user profile, the user may provide the system with account information (e.g., account number, username, password, etc.). The server(s) 120 (or components thereof) may use the account information to communicate with a device server(s) associated with the vehicle. The server(s) 120 may be restricted from sending data to or receiving data from a device server(s) until the server(s) 120 authenticates itself with the device server(s) using the account information and/or a device identifier specific to the device newly associated with the user profile.

The profile storage 270, or a different storage, may store device profiles. Each device profile may be associated with a different device identifier. Each device profile may represent output capabilities (e.g., audio, video, quality of output, etc.) of the device. Each device profile may also represent a speechlet component identifier specific to a device-specific speechlet component associated with the device. For example, if the device 110 is a vehicle, the speechlet component identifier may represent a vehicle manufacturer speechlet component associated with the vehicle. For further example, if the device 110 is an appliance, the speechlet component identifier may represent an appliance manufacturer speechlet component associated with the appliance.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the component(s) of the system(s) and/or user are located.

The server(s) 120 may include a user recognition component 295 that recognizes one or more users associated with data input to the system. The user recognition component 295 may take as input the audio data 211, text data 213, and/or text data output by the ASR component 250. The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.) received by the system in correlation with the present user input to stored biometric data of users. The user recognition component 295 may further perform user recognition by comparing image data (e.g., including a representation of at least a feature of a user) received by the system in correlation with the present user input with stored image data including representations of features of different users. The user recognition component 295 may perform additional user recognition processes, including those known in the art. Output of the user recognition component 295 may include a single user identifier corresponding to the most likely user that originated the present input. Alternatively, output of the user recognition component 295 may include an N-best list of user identifiers with respective scores indicating likelihoods of respective users originating the present input. The output of the user recognition component 295 may be used to inform NLU processing as well as processing performed by speechlet components 290.

Figure 3:
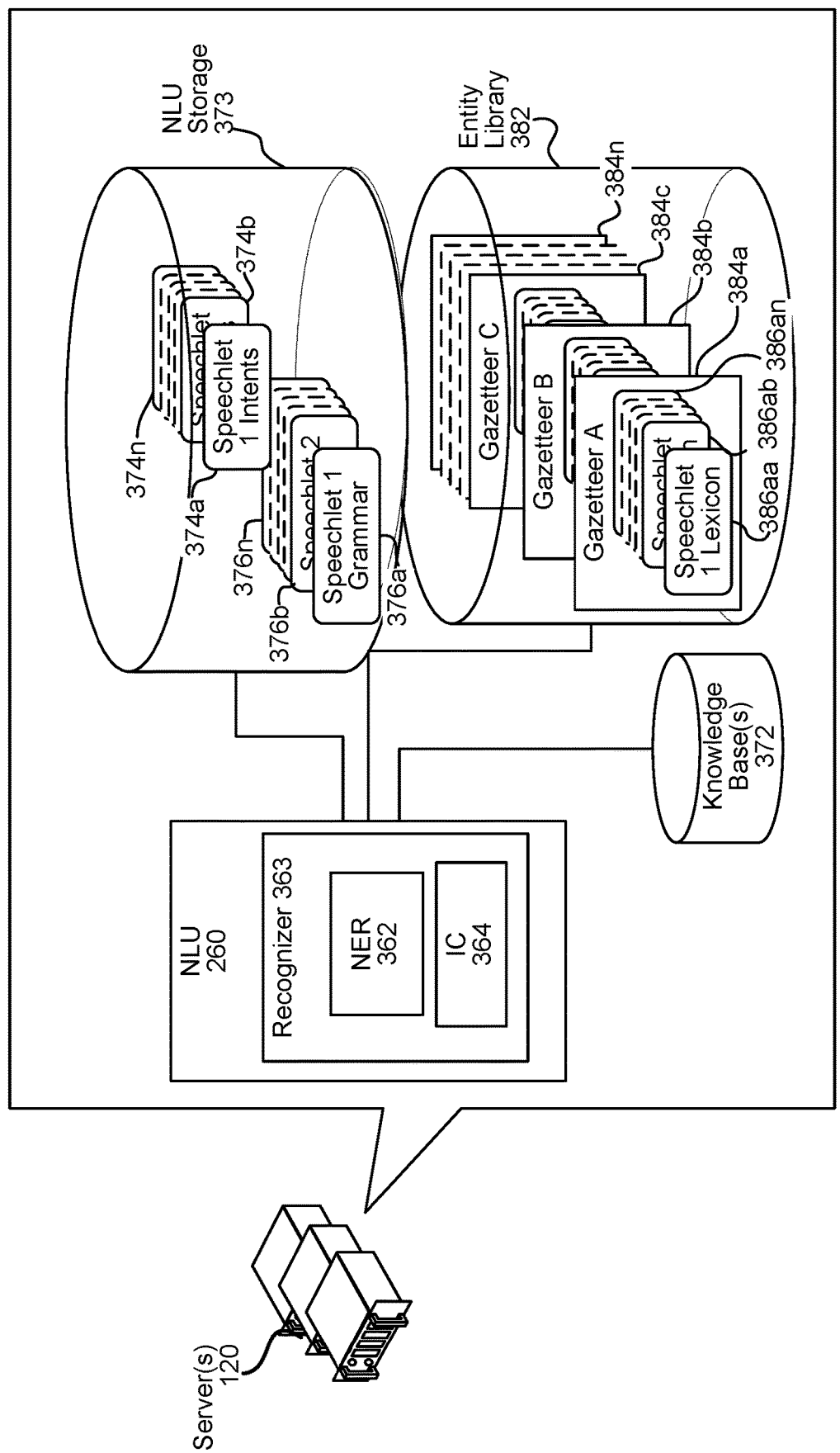
FIG. 3 is a conceptual diagram of how natural language understanding processing is performed according to embodiments of the present disclosure.

FIG. 3 illustrates how NLU processing is performed on text data. Generally, the NLU component 260 attempts to make a semantic interpretation of text data input thereto. That is, the NLU component 260 determines the meaning behind text data based on the individual words and/or phrases represented therein. The NLU component 260 interprets text data to derive an intent of the user as well as pieces of the text data that allow a device (e.g., the device 110, the server(s) 120, etc.) to complete that action. For example, if the NLU component 260 receives text data corresponding to "tell me the weather," the NLU component 260 may determine that the user intends the system to output weather information.

The NLU component 260 may process text data including several hypotheses. For example, if the ASR component 250 outputs text data including an N-best list of ASR hypotheses, the NLU component 260 may process the text data with respect to all (or a portion of) the ASR hypotheses represented therein. Even though the ASR component 250 may output an N-best list of ASR hypotheses, the NLU component 260 may be configured to only process with respect to the top scoring ASR hypothesis in the N-best list.

The NLU component 260 may annotate text data by parsing and/or tagging the text data. For example, for the text data "tell me the weather for Seattle," the NLU component 260 may tag "Seattle" as a location for the weather information.

The NLU component 260 may include one or more recognizers 363. Each recognizer 363 may be associated with a different speechlet component 290. Each recognizer 363 may process with respect to text data input to the NLU component 260. Each recognizer 363 may operate in parallel with other recognizers 363 of the NLU component 260.

Each recognizer 363 may include a named entity recognition (NER) component 362. The NER component 362 attempts to identify grammars and lexical information that may be used to construe meaning with respect to text data input therein. The NER component 362 identifies portions of text data that correspond to a named entity that may be applicable to processing performed by a speechlet component 290, associated with the recognizer 363 implementing the NER component 362. The NER component 362 (or other component of the NLU component 260) may also determine whether a word refers to an entity whose identity is not explicitly mentioned in the text data, for example "him," "her," "it" or other anaphora, exophora or the like.

Each recognizer 363, and more specifically each NER component 362, may be associated with a particular grammar model and/or database 373, a particular set of intents/actions 374, and a particular personalized lexicon 386. Each gazetteer 384 may include speechlet-indexed lexical information associated with a particular user and/or device 110. For example, a Gazetteer A (384a) includes speechlet-indexed lexical information 386aa to 386an. A user's music speechlet lexical information might include album titles, artist names, and song names, for example, whereas a user's contact list speechlet lexical information might include the names of contacts. Since every user's music collection and contact list is presumably different, this personalized information improves entity resolution.

An NER component 362 applies grammar models 376 and lexical information 386 associated with the speechlet component 290 (associated with the recognizer 363 implementing the NER component 362) to determine a mention of one or more entities in text data. In this manner, the NER component 362 identifies "slots" (corresponding to one or more particular words in text data) that may be needed for later processing. The NER component 362 may also label each slot with a type (e.g., noun, place, city, artist name, song name, etc.).

Each grammar model 376 includes the names of entities (i.e., nouns) commonly found in speech about the particular speechlet component 290 to which the grammar model 376 relates, whereas the lexical information 386 is personalized to the user and/or the device 110 from which the user input originated. For example, a grammar model 376 associated with a shopping speechlet component may include a database of words commonly used when people discuss shopping.

A downstream process called named entity resolution (discussed in detail elsewhere herein) actually links a portion of text data to an actual specific entity known to the system. To perform named entity resolution, the NLU component 260 may utilize gazetteer information (384a-384n) stored in an entity library storage 382. The gazetteer information 384 may be used to match text data with different entities, such as song titles, contact names, etc. Gazetteers 384 may be linked to users (e.g., a particular gazetteer may be associated with a specific user's music collection), may be linked to certain speechlet components 290 (e.g., a shopping speechlet component, a music speechlet component, a video speechlet component, a device-specific speechlet component, etc.), or may be organized in a variety of other ways.

Each recognizer 363 may also include an intent classification (IC) component 364. An IC component 364 parses text data to determine an intent(s), associated with the speechlet component 290 (associated with the recognizer 363 implementing the IC component 364), that potentially represents the user input. An intent represents to an action a user desires be performed. An IC component 364 may communicate with a database 374 of words linked to intents. For example, a music intent database may link words and phrases such as "quiet," "volume off," and "mute" to a <Mute> intent. An IC component 364 identifies potential intents by comparing words and phrases in text data to the words and phrases in an intents database 374, associated with the speechlet component 290 that is associated with the recognizer 363 implementing the IC component 364.

The intents identifiable by a specific IC component 364 are linked to speechlet-specific (i.e., the speechlet component 290 associated with the recognizer 363 implementing the IC component 364) grammar frameworks 376 with "slots" to be filled. Each slot of a grammar framework 376 corresponds to a portion of text data that the system believes corresponds to an entity. For example, a grammar framework 376 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386 (associated with the speechlet component 290 associated with the recognizer 363 implementing the NER component 362), attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music speechlet recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music speechlet, which an IC component 364 (also implemented by the music speechlet recognizer) may determine corresponds to a <PlayMusic> intent. At this stage, no determination has been made as to the meaning of "mother's little helper" and "the rolling stones," but based on grammar rules and models, the NER component 362 has determined the text of these phrases relates to the grammatical object (i.e., entity) of the user input represented in the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words associated with the speechlet component 290 (in the knowledge base 372). For example, if the text data includes "play songs by the rolling stones," after failing to determine an album name or song name called "songs" by "the rolling stones," the NER component 362 may search the speechlet vocabulary for the word "songs." In the alternative, generic words may be checked before the gazetteer information, or both may be tried, potentially producing two different results.

An NER component 362 may tag text data to attribute meaning thereto. For example, an NER component 362 may tag "play mother's little helper by the rolling stones" as: {speechlet} Music, {intent}<PlayMusic>, {artist name} rolling stones, {media type} SONG, and {song title} mother's little helper. For further example, the NER component 362 may tag "play songs by the rolling stones" as: {speechlet} Music, {intent}<PlayMusic>, {artist name} rolling stones, and {media type} SONG.

Figure 4:
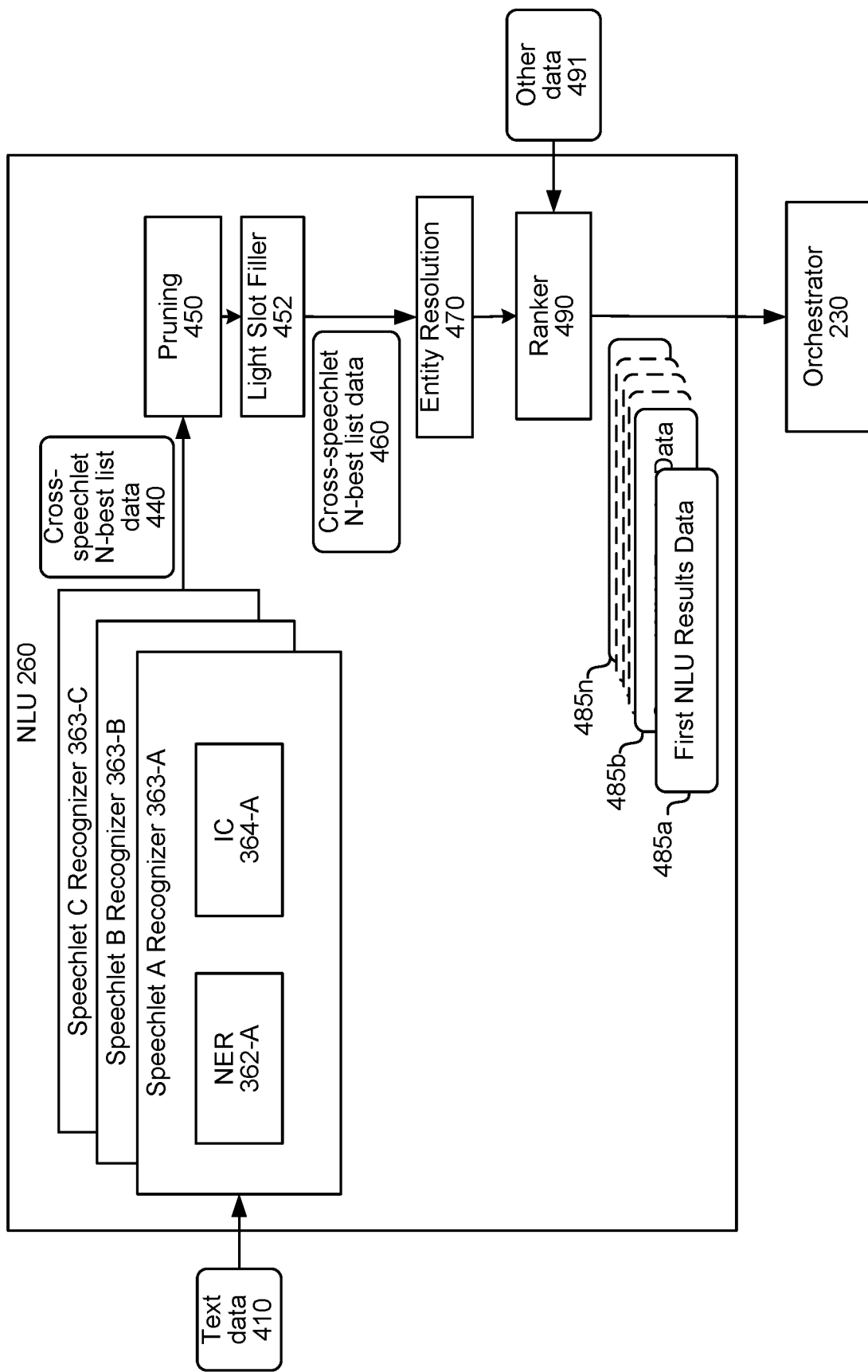
FIG. 4 is a conceptual diagram of how natural language understanding processing is performed according to embodiments of the present disclosure.

The NLU component 260 may generate cross-speechlet N-best list data 440, which may include a list of NLU hypotheses output by each recognizer 363 (as illustrated in FIG. 4). A recognizer 363 may output tagged text data generated by an NER component 362 and an IC component 364 operated by the recognizer 363, as described above. Each NLU hypothesis including an intent indicator and text/slots called out by the NER component 362 may be grouped as an NLU hypothesis represented in the cross-speechlet N-best list data 440. Each NLU hypothesis may also be associated with one or more respective score(s) for the NLU hypothesis. For example, the cross-speechlet N-best list data 440 may be represented as, with each line representing a separate NLU hypothesis:

[0.95] Intent: <PlayMusic> ArtistName: Lady Gaga SongName: Poker Face

[0.95] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The NLU component 260 may send the cross-speechlet N-best list data 440 to a pruning component 450. The pruning component 450 may sort the NLU hypotheses represented in the cross-speechlet N-best list data 440 according to their respective scores. The pruning component 450 may then perform score thresholding with respect to the cross-speechlet N-best list data 440. For example, the pruning component 450 may select NLU hypotheses represented in the cross-speechlet N-best list data 440 associated with confidence scores satisfying (e.g., meeting and/or exceeding) a threshold confidence score. The pruning component 450 may also or alternatively perform number of NLU hypothesis thresholding. For example, the pruning component 450 may select a maximum threshold number of top scoring NLU hypotheses. The pruning component 450 may generate cross-speechlet N-best list data 460 including the selected NLU hypotheses. The purpose of the pruning component 450 is to create a reduced list of NLU hypotheses so that downstream, more resource intensive, processes may only operate on the NLU hypotheses that most likely represent the user's intent.

The NLU component 260 may also include a light slot filler component 452. The light slot filler component 452 can take text data from slots represented in the NLU hypotheses output by the pruning component 450 and alter it to make the text data more easily processed by downstream components. The light slot filler component 452 may perform low latency operations that do not involve heavy operations such as reference to a knowledge base. The purpose of the light slot filler component 452 is to replace words with other words or values that may be more easily understood by downstream system components. For example, if an NLU hypothesis includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-speechlet N-best list data 460.

The NLU component 260 sends the cross-speechlet N-best list data 460 to an entity resolution component 470. The entity resolution component 470 can apply rules or other instructions to standardize labels or tokens from previous stages into an intent/slot representation. The precise transformation may depend on the speechlet component 290. For example, for a travel speechlet component, the entity resolution component 270 may transform text data corresponding to "Boston airport" to the standard BOS three-letter code referring to the airport. The entity resolution component 470 can refer to a knowledge base that is used to specifically identify the precise entity referred to in each slot of each NLU hypothesis represented in the cross-speechlet N-best list data 460. Specific intent/slot combinations may also be tied to a particular source, which may then be used to resolve the text data. In the example "play songs by the stones," the entity resolution component 470 may reference a personal music catalog, Amazon Music account, user profile data, or the like. The entity resolution component 470 may output text data including an altered N-best list that is based on the cross-speechlet N-best list data 460, and that includes more detailed information (e.g., entity IDs) about the specific entities mentioned in the slots and/or more detailed slot data that can eventually be used by a speechlet component 290. The NLU component 260 may include multiple entity resolution components 470 and each entity resolution component 470 may be specific to one or more speechlet components 290.

The entity resolution component 470 may not be successful in resolving every entity and filling every slot represented in the cross-speechlet N-best list data 460. This may result in the entity resolution component 470 outputting incomplete results.

The NLU component 260 may include a ranker component 490. The ranker component 490 may assign a particular confidence score to each NLU hypothesis input therein. The confidence score of an NLU hypothesis may represent a confidence of the system in the NLU processing performed with respect to the NLU hypothesis. The confidence score of a particular NLU hypothesis may be affected by whether the NLU hypothesis has unfilled slots. For example, if an NLU hypothesis associated with a first speechlet component includes slots that are all filled/resolved, that NLU hypothesis may be assigned a higher confidence score than another NLU hypothesis including at least some slots that are unfilled/unresolved by the entity resolution component 470.

The ranker component 490 may apply re-scoring, biasing, or other techniques to determine the top scoring NLU hypotheses. To do so, the ranker component 490 may consider not only the data output by the entity resolution component 470, but may also consider other data 491. The other data 491 may include a variety of information. The other data 491 may include speechlet component 290 rating or popularity data. For example, if one speechlet component 290 has a particularly high rating, the ranker component 490 may increase the score of an NLU hypothesis associated with that speechlet component 290. The other data 491 may also include information about speechlet components 290 that have been enabled for the user identifier and/or device identifier associated with the current user input. For example, the ranker component 490 may assign higher scores to NLU hypotheses associated with enabled speechlet components 290 than NLU hypotheses associated with non-enabled speechlet components 290. The other data 491 may also include data indicating user usage history, such as if the user identifier associated with the current user input is regularly associated with user input that invokes a particular speechlet component 290 or does so at particular times of day. The other data 491 may additionally include data indicating date, time, location, weather, type of device 110, user identifier, device identifier, context, as well as other information. For example, the ranker component 490 may consider when any particular speechlet component 290 is currently active (e.g., music being played, a game being played, etc.) with respect to the user or device associated with the current user input. The other data 291 may also include device type information. For example, if the device 110 does not include a display, the ranker component 490 may decrease the score associated with NLU hypotheses that would result in displayable content being presented to a user.

Following ranking by the ranker component 490, the NLU component 260 may output NLU results data 485 to the orchestrator component 230. The NLU results data 485 may include first NLU results data 485*a* including tagged text data associated with a first speechlet component 290*a*, second NLU results data 485*b* including tagged text data associated with a second speechlet component 290*b*, etc. The NLU results data 485 may include the top scoring NLU hypotheses (e.g., in the form of an N-best list) as determined by the ranker component 490. Alternatively, the NLU results data 485 may include the top scoring NLU hypothesis as determined by the ranker component 490.

Prior to the orchestrator component 230 sending text data to the NLU component 260, the orchestrator component 230 may determine whether the device 110 is associated with a device-specific speechlet component 290. The orchestrator component 230 may use the device identifier, received from the device 110, to determine device profile data associated with the device 110. The orchestrator component 230 may determine the device profile data represents a speechlet component identifier unique to a device-specific speechlet component associated with the device 110. Alternatively, the orchestrator component 230 may determine the device profile data represents a manufacturer of the device 110. The orchestrator component 230 may then determine whether the system includes a device-specific speechlet component associated with the device manufacturer.

If the orchestrator component 230 determines the device 110 is associated with a device-specific speechlet component, the orchestrator component 230 calls the NLU component 260 twice. The orchestrator component 230 calls the NLU component 260 to perform NLU processing on text data (received from the device 110, or output by the ASR component 250) with respect to various speechlet components of the system, as described above with respect to FIGS. 3 and 4. The orchestrator component 230 also separately calls the NLU component 260 to perform NLU processing on the text data specifically with respect to the device-specific speechlet component. The NLU component 260 may perform the foregoing processing at least partially in parallel, and output NLU results of the respective processing to the orchestrator component 230. The orchestrator component 230 may then rank the received NLU results to determine which speechlet component should be called to execute with respect to the current user input.

Figure 5:
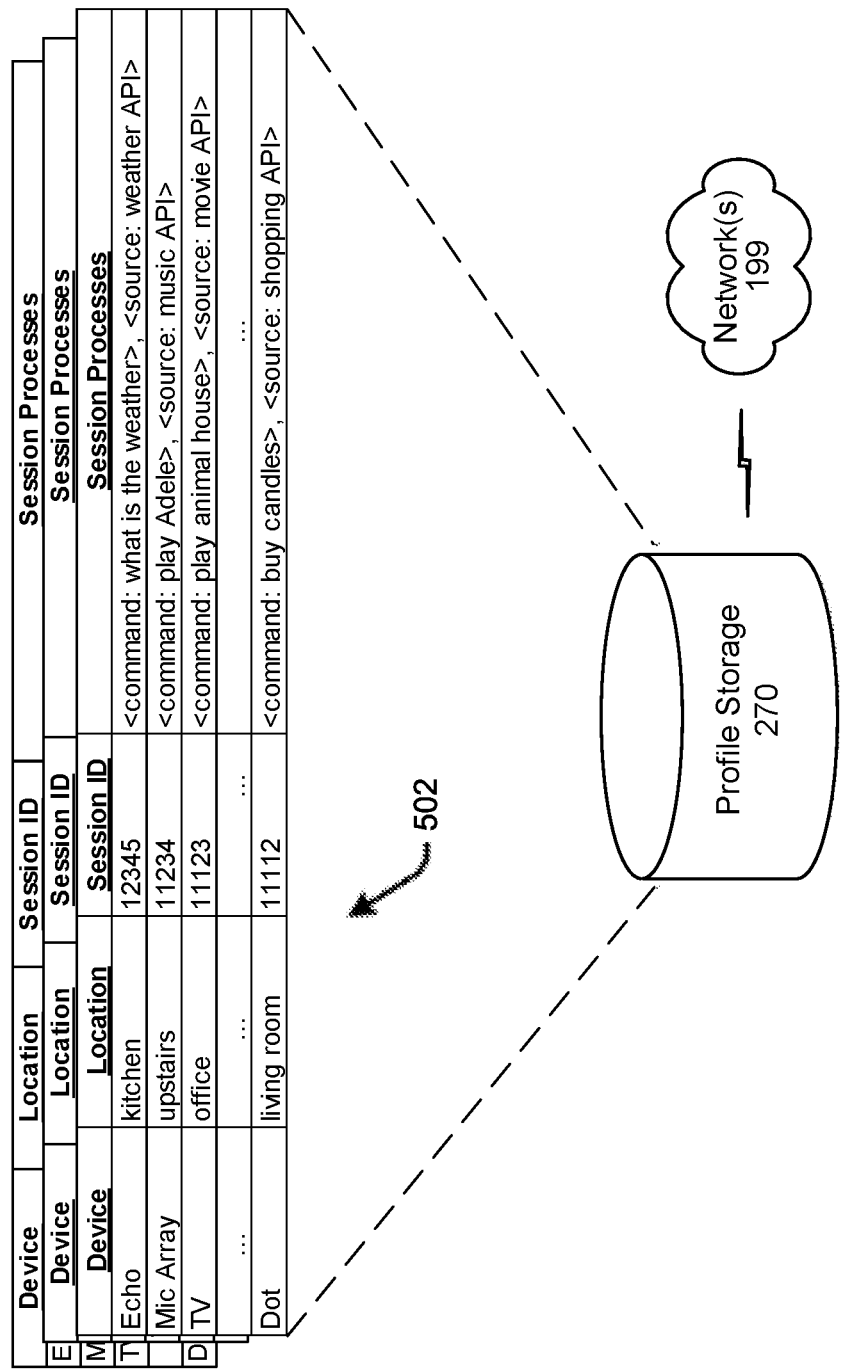
FIG. 5 illustrates data stored and associated with user profiles according to embodiments of the present disclosure.

FIG. 5 illustrates data stored and associated with user accounts according to embodiments of the present disclosure. The server(s) 120 may include or refer to data regarding user accounts 502 (e.g., user profile(s)), shown by the profile storage 270 illustrated in FIG. 5. The profile storage 270 may be located proximate to server(s) 120, or may otherwise be in communication with various components, for example over network(s) 199. In an example, the profile storage 270 is a cloud-based storage.

As discussed above, the profile storage 270 may include a variety of information related to individual users, households, accounts, etc. that interact with the system 100. For illustration, as shown in FIG. 5, each user profile 502 may include data such as device type information, device location information, session ID information, and processes performed with respect to each session ID. Each user profile 502 may also include information about previous usage history (e.g., number of times an application is used), previous commands/intents, temporal information or the like. In addition, a user profile 502 may store other data as well. In some examples, the profile storage 270 may include data regarding devices associated with particular individual user accounts 502. Such data may include device identifier (ID) and internet protocol (IP) address information for different devices as well as names by which the devices may be referred to by a user. Further qualifiers describing the devices may also be listed along with a description of the type of object of the device.

Figure 6:
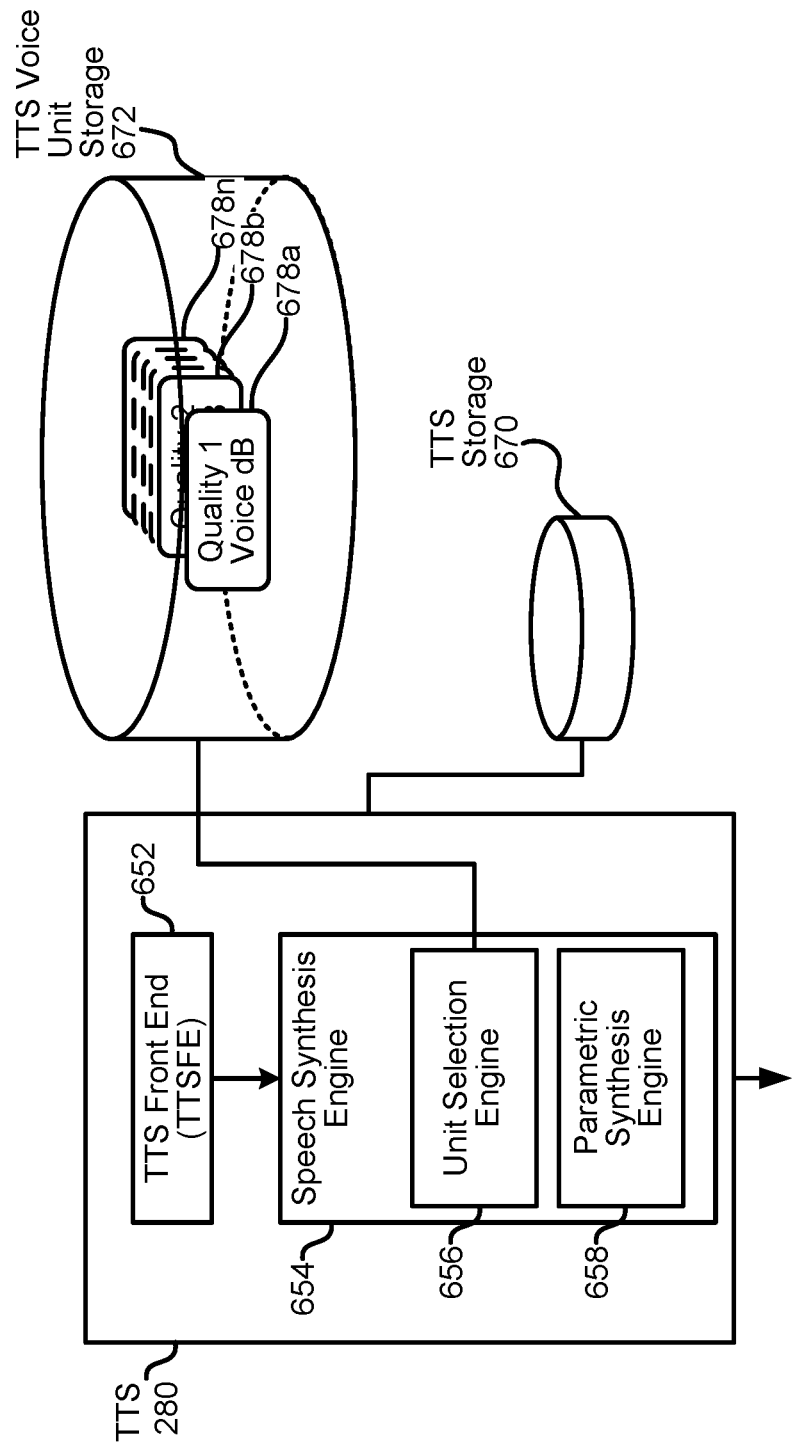
FIG. 6 illustrates an example of a text-to-speech (TTS) component generating TTS or synthesized speech according to examples of the present disclosure.

FIG. 6 illustrates an example of a text-to-speech (TTS) component 280 generating TTS or synthesized speech according to examples of the present disclosure. The TTS component/processor 280 includes a TTS front end (TTSFE) 652, a speech synthesis engine 654, and TTS storage 670. The TTSFE 652 transforms input text data (for example from command processor 290) into a symbolic linguistic representation for processing by the speech synthesis engine 654. The TTSFE 652 may also process tags or other data input to the TTS component that indicate how specific words should be pronounced (e.g., an indication that a word is an interjection). The speech synthesis engine 654 compares the annotated phonetic units models and information stored in the TTS storage 670 for converting the input text into speech. The TTSFE 652 and speech synthesis engine 654 may include their own controller(s)/processor(s) and memory or they may use the controller/processor and memory of the server(s) 120, device 110, or other device, for example. Similarly, the instructions for operating the TTSFE 652 and speech synthesis engine 654 may be located within the TTS component 280, within the memory and/or storage of the server(s) 120, device 110, or within an external device.

Text input into a TTS component 280 may be sent to the TTSFE 652 for processing. The front-end may include components for performing text normalization, linguistic analysis, and linguistic prosody generation. During text normalization, the TTSFE processes the text input and generates standard text, converting such things as numbers, abbreviations (such as Apt., St., etc.), symbols ($, %, etc.) into the equivalent of written out words.

During linguistic analysis the TTSFE 652 analyzes the language in the normalized text to generate a sequence of phonetic units corresponding to the input text. This process may be referred to as phonetic transcription. Phonetic units include symbolic representations of sound units to be eventually combined and output by the system as speech. Various sound units may be used for dividing text for purposes of speech synthesis. A TTS component 280 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage 670. The linguistic analysis performed by the TTSFE 652 may also identify different grammatical components such as prefixes, suffixes, phrases, punctuation, syntactic boundaries, or the like. Such grammatical components may be used by the TTS component 280 to craft a natural sounding audio waveform output. The language dictionary may also include letter-to-sound rules and other tools that may be used to pronounce previously unidentified words or letter combinations that may be encountered by the TTS component 280. Generally, the more information included in the language dictionary, the higher quality the speech output.

Based on the linguistic analysis the TTSFE 652 may then perform linguistic prosody generation where the phonetic units are annotated with desired prosodic characteristics, also called acoustic features, which indicate how the desired phonetic units are to be pronounced in the eventual output speech. During this stage the TTSFE 652 may consider and incorporate any prosodic annotations that accompanied the text input to the TTS component 280. Such acoustic features may include pitch, energy, duration, and the like. Application of acoustic features may be based on prosodic models available to the TTS component 280. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information.

The output of the TTSFE 652, referred to as a symbolic linguistic representation, may include a sequence of phonetic units annotated with prosodic characteristics. This symbolic linguistic representation may be sent to a speech synthesis engine 654, also known as a synthesizer, for conversion into an audio waveform of speech for output to an audio output device and eventually to a user. The speech synthesis engine 654 may be configured to convert the input text into high-quality natural-sounding speech in an efficient manner. Such high-quality speech may be configured to sound as much like a human speaker as possible, or may be configured to be understandable to a listener without attempts to mimic a precise human voice.

A speech synthesis engine 654 may perform speech synthesis using one or more different methods. In one method of synthesis called unit selection, described further below, a unit selection engine 656 matches the symbolic linguistic representation created by the TTSFE 652 against a database of recorded speech, such as a database of a voice corpus. The unit selection engine 656 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc.

Using all the information in the unit database, a unit selection engine 656 may match units to the input text to create a natural sounding waveform. The unit database may include multiple examples of phonetic units to provide the system with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis called parametric synthesis parameters such as frequency, volume, noise, are varied by a parametric synthesis engine 658, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. A TTS component 280 may include an acoustic model, or other models, which may convert a symbolic linguistic representation into a synthetic acoustic waveform of the text input based on audio signal manipulation. The acoustic model includes rules which may be used by the parametric synthesis engine 658 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTSFE 652.

The parametric synthesis engine 658 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 654, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise) based vocoders, CELP (code-excited linear prediction) vocoders, GlottHMM vocoders, HSM (harmonic/stochastic model) vocoders, or others.

Unit selection speech synthesis may be performed as follows. Unit selection includes a two-step process. First a unit selection engine 656 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well a given speech unit matches the features of a desired speech output (e.g., pitch, prosody, etc.). A join cost represents how well a speech unit matches a consecutive speech unit for purposes of concatenating the speech units together in the eventual synthesized speech. The overall cost function is a combination of target cost, join cost, and other costs that may be determined by the unit selection engine 656. As part of unit selection, the unit selection engine 656 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS storage 670 and/or in another storage component. For example, different unit selection databases may be stored in TTS voice unit storage 672. Each speech unit database includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 654 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Audio waveforms including the speech output from the TTS component 280 may be sent to an audio output component, such as a speaker for playback to a user or may be sent for transmission to another device, such as another server(s) 120, for further processing or output to a user. Audio waveforms including the speech may be sent in a number of different formats such as a series of feature vectors, uncompressed audio data, or compressed audio data. For example, audio speech output may be encoded and/or compressed by an encoder/decoder (not shown) prior to transmission. The encoder/decoder may be customized for encoding and decoding speech data, such as digitized audio data, feature vectors, etc. The encoder/decoder may also encode non-TTS data of the system, for example using a general encoding scheme such as .zip, etc.

A TTS component 280 may be configured to perform TTS processing in multiple languages. For each language, the TTS component 280 may include specially configured data, instructions and/or components to synthesize speech in the desired language(s). To improve performance, the TTS component 280 may revise/update the contents of the TTS storage 670 based on feedback of the results of TTS processing, thus enabling the TTS component 280 to improve speech recognition.

Other information may also be stored in the TTS storage 670 for use in speech recognition. The contents of the TTS storage 670 may be prepared for general TTS use or may be customized to include sounds and words that are likely to be used in a particular application. For example, for TTS processing by a global positioning system (GPS) device, the TTS storage 670 may include customized speech specific to location and navigation. In certain instances the TTS storage 670 may be customized for an individual user based on his/her individualized desired speech output. For example a user may prefer a speech output voice to be a specific gender, have a specific accent, speak at a specific speed, have a distinct emotive quality (e.g., a happy voice), or other customizable characteristic(s) (such as speaking an interjection in an enthusiastic manner) as explained in other sections herein. The speech synthesis engine 654 may include specialized databases or models to account for such user preferences.

For example, to create the customized speech output of the system, the system may be configured with multiple voice corpuses/unit databases 678a-678n, where each unit database is configured with a different "voice" to match desired speech qualities. The voice selected by the TTS component 280 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterance may be spoken by an individual and recorded by the system. The TTS training utterances used to train a TTS voice corpus may be different from the training utterances used to train an ASR system or the models used by the speech quality detector. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice corpuses 678 may then be used during runtime to perform unit selection to synthesize speech having a speech quality corresponding to the input speech quality.

Figure 7:
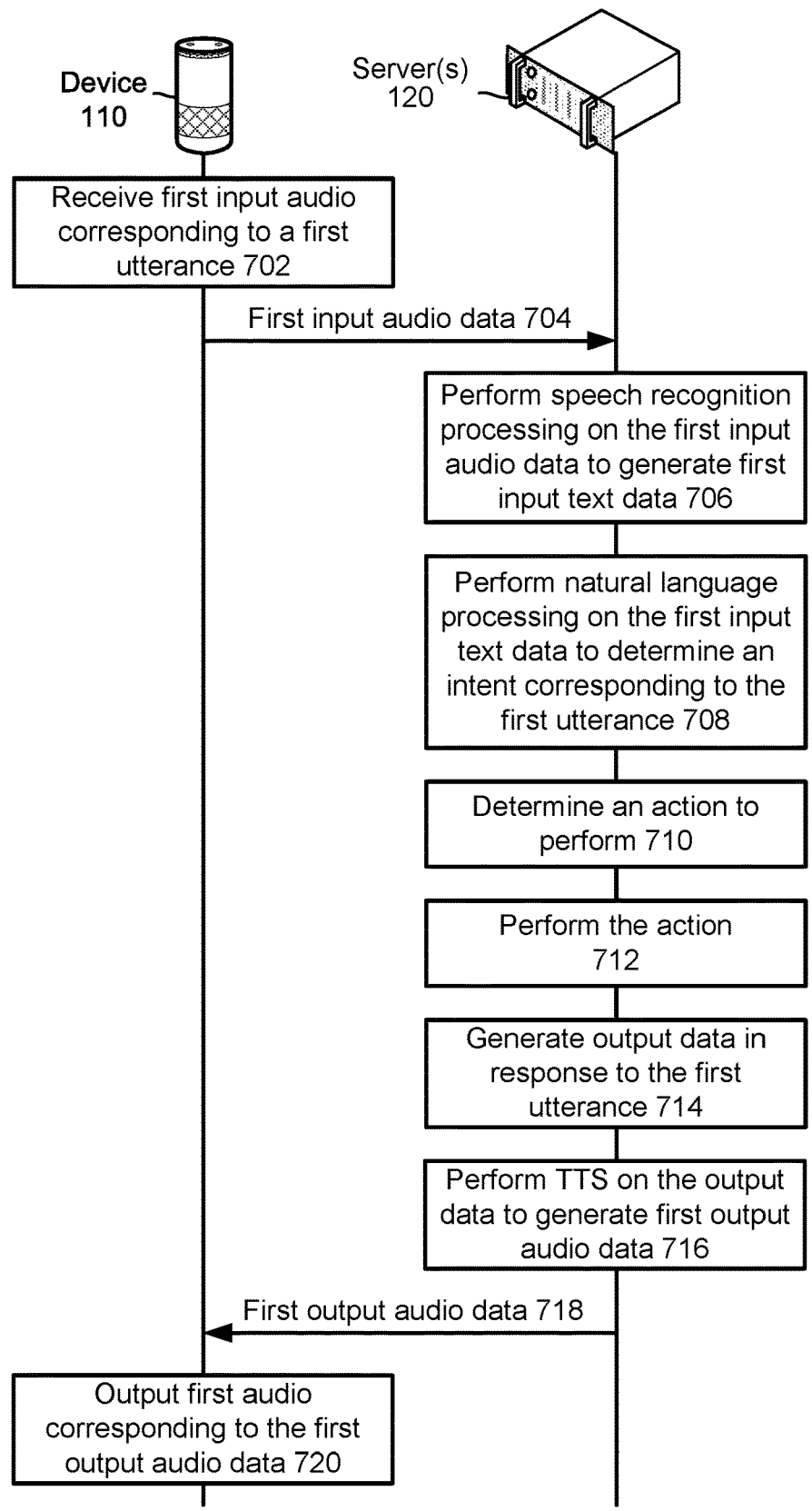
FIG. 7 is a signal flow diagram illustrating an example of processing speech and generating output audio according to embodiments of the present disclosure.

FIG. 7 is a signal flow diagram illustrating an example of processing speech and generating output audio according to embodiments of the present disclosure. A device 110 receives (702) input audio corresponding to an utterance of a user. The device 110 generates input audio data corresponding to the received input audio and sends (704) the input audio data to the server(s) 120 for processing.

When the server(s) 120 receives the first input audio data, the server(s) 120 performs (706) speech recognition on the first input audio data to generate first input text data. The server(s) 120 also performs (708) natural language processing on the first input text data to determine an intent of a user command represented in the utterance of the input audio. Based on the intent of the user command, the server(s) 120 determine (710) an action to perform and perform (712) the action. For example, the server(s) 120 may extract information from the first text data in order to generate request data corresponding to a request, such as a food order, hotel reservation or the like. As part of performing the action, the server(s) 120 may acquire business profile data and/or template data associated with the action. The server(s) 120 may use the business profile data and/or the template data to generate the request data.

In some examples, in addition to generating the request data, the server(s) 120 may perform the action by conducting a voice interaction with a customer or a business (e.g., calling to place an order, a reservation, and/or the like). While FIG. 7 only illustrates a simple example of the server(s) 120 processing input audio data and generating output audio data without illustrating any secondary interactions, the disclosure is not limited thereto. Thus, the server(s) 120 may perform additional actions and/or may interact with additional devices in order to perform the action.

After performing the action in step 712, the server(s) 120 may generate (714) output data in response to the first utterance and may perform (716) text-to-speech (TTS) processing on the output data to generate first output audio data. For example, the output data may include text data to be output to a user as synthesized speech and the server(s) 120 may perform TTS processing to generate the output audio data including the synthesized speech.

The server(s) 120 may send (718) the output audio data to the user device 110 and the device 110 may output (720) audio corresponding to the output audio data. Thus, the device 110 may output the audio to a user 5 local to the device 110. If the user 5 responds to the audio, the device 110 may receive second input audio corresponding to a second utterance and repeat the steps listed above.

For ease of illustration, FIG. 7 illustrates a high level signal flow diagram encompassing the overall system for processing speech and generating output audio. However, the server(s) 120 may perform additional steps to determine an intent corresponding to the speech and generate output audio.

In some examples, the server(s) 120 may determine that there is enough information to process the speech and select an action that corresponds to the speech without further input from the user 5. For example, the server(s) 120 may generate one or more candidate actions and select one of the actions using the orchestrator 230. The server(s) 120 may determine a confidence score associated with the selected action, which indicates a likelihood that the action corresponds to the speech, and if the confidence score is above a threshold value the server(s) 120 may dispatch the action to a speechlet 290 associated with the selected action. Dispatching the action refers to sending an instruction to the speechlet 290 to execute a command, which may be indicated by a framework having slots/fields that correspond to the selected action.

In other examples, the server(s) 120 may determine that there is not enough information to select an action and may request additional information from the user 5. The server(s) 120 may utilize thresholding to determine whether a specific action is being invoked by the user 5 or whether there is insufficient information to select an action. For example, if the server(s) 120 determines one or more intents that may correspond to the speech, but none of the intents are associated with a confidence value meeting or exceeding a threshold value, the server(s) 120 may request additional information. While the server(s) 120 may dispatch the selected action despite the confidence score being below the threshold value, a lower confidence score corresponds to an increased likelihood that the selected action is not what the user 5 intended. Thus, dispatching the selected action may result in performing a command that is different than the user 5 requested, resulting in a lower user satisfaction value after the command is executed.

In order to increase the likelihood that the selected action corresponds to the speech, the server(s) 120 may generate a prompt requesting additional information and/or clarification from the user 5. For example, in response to a request to "book a flight to Portland," the server(s) 120 may generate a prompt that solicits the user as to whether Portland corresponds to Portland, Oregon or Portland, Maine (e.g., "Would you like to fly to Portland, Oregon, or to Portland, Maine?"). The solicitation may take the form of text output via a display of a user device or audio output by a speaker of a user device. The solicitation may be output by a device different from the device that received the speech. For example, a first device 110a may generate the input audio data but a second device 110b may output the solicitation to the user without departing from the disclosure. Accordingly, if the solicitation to the user is to be audio, the TTS component 280 may generate output audio data based on the text data of the prompt and the device 110 may output audio corresponding to the output audio data.

In response to the output audio, the user may provide additional information. Thus, the server(s) 120 may receive second input audio data and perform speech recognition processing and natural language process on the second input audio data to determine the additional information. If the additional information clarifies the request, the server(s) 120 may select an action having a confidence score above the threshold value and execute a command.

As described above, FIG. 7 illustrates a high level signal flow diagram encompassing the overall system for processing speech and generating output audio. For example, FIG. 7 illustrates an example of the server(s) 120 receiving input audio data representing a voice command, processing the input audio data to determine an intent and a corresponding action associated with the voice command, performing the action, and then generating output audio data in response to the voice command. For ease of illustration, the following drawings may not go into detail about how the server(s) 120 process input audio data and generate output audio data. Instead, the following drawings may omit details in order to illustrate important concepts of the invention.

To implement voice to voice NLU processing, the system 100 may include standardized voice user interface (VUI) components in a skill creation database. For example, the skill creation database may include a plurality of standardized components enabling different functionality, such that a non-technical user may create a skill by combining multiple standardized components. Each standardized component may correspond to a framework or template (e.g., script) enabling specific functionality, with a list of inputs and outputs that can be modified by the user. Thus, by combining multiple standardized components, the user may create a skill configured to perform one or more actions without requiring extensive customized programming or technical expertise.

The system 100 may enable a user to create the skill using a web-based interface (e.g., using a web browser or the like, instead of a specific application). For example, the user may select standardized components from the skill creation database, and each component may correspond to an individual framework or template (e.g., script) that can be modified by the user to perform the desired functionality. Thus, the user may input text data or the like to customize the skill.

When the VUI component is added to a speechlet to create a skill, the VUI component enables the skill to translate an utterance that includes a voice command or user query to data representing the utterance (e.g., text data, intent data, etc. corresponding to the utterance). Thus, the VUI component enables the server(s) 120 to interact with a user to receive instructions from the user, extract information from the user, provide information to the user, and/or the like. When two VUI components are added to the speechlet, a first VUI component (e.g., user-directed VUI component) enables the skill to translate an utterance from a first user 5a to first data and a second VUI component (e.g., business directed VUI component) enables the skill to translate the first data to output audio data that is sent to a device associated with a second user 5b. Thus, the server(s) 120 may act as an intermediary between the first user 5a and the second user 5b, enabling both the first user 5a and the second user 5b to interact with the server(s) 120 using voice commands.

In some examples, the server(s) 120 may translate and/or convert first data associated with the first VUI component to second data associated with the second VUI component in order to generate the output audio data. For example, the server(s) 120 may identify slots (e.g., information requested by the skill) associated with the skill and may use outputs from the VUI components as input to the slots, which are then output to the second VUI component. The skill may correspond to template data that indicates the information required by the skill to perform the action. For example, to successfully place an order at a restaurant, the skill must receive one or more menu item(s) associated with the order, as well as a name, address, phone number, and/or other personal information associated with a customer. This information may be indicated in the template data, such that the server(s) 120 prompt the customer to provide the information before ending the first voice interaction.

By creating a skill that performs voice to voice NLU processing, a business 20 may offer services to customers without existing infrastructure, extensive programming, and/or the like. For example, the business 20 may not have the infrastructure to directly enable online ordering (e.g., receive orders as data from a speechlet or app programmed specifically for the business 20), but the system 100 may enable the business 20 to create a skill that offers online ordering, with the business 20 receiving the orders from the server(s) 120 using the VUI component.

While many of the examples described herein refer to a business implementation in which the skill enables a business to provide services to a customer, the disclosure is not limited thereto. Instead, the skill may be used to enable user to user voice interactions and/or business enterprise voice interactions (e.g., provide services to employees of a business) without departing from the disclosure. To illustrate an example of a user to user voice interaction, the skill may enable party planning or other organizing functionality between multiple users (e.g., friends and family) outside of a business environment. For example, a single user may use the skill to send notifications and/or request information (e.g., number of guests attending, items provided, special needs requested) from multiple users in order to organize an event. Additionally or alternatively, the skill may correspond to an interactive voice trivia game or other social interaction without departing from the disclosure. To illustrate an example of a business enterprise voice interaction, a business may create a skill to enable employees to interact between departments, organize events, access information, and/or the like. Thus, the business may create the skill in order to provide additional services and/or convenience to employees.

In some examples, the skill may be customized to control which user profile(s) and/or account(s) are given access to the skill. For example, a skill may be customized to only be accessible by friends and family of the skill creator. Additionally or alternatively, the business may customize the business enterprise skill to only be accessible by employees of the business.

To restrict access, the server(s) 120 may perform some form of filtering to identify whether a particular user profile and/or account is permitted to access to the skill. For example, the server(s) 120 may determine that a voice command is invoking the skill, determine that a corresponding user profile is not permitted access to the skill, and explicitly deny access to the skill. Additionally or alternatively, the server(s) 120 may implicitly restrict access by ignoring potential intents associated with the skill. For example, the server(s) 120 may determine a plurality of potential intents associated with the voice command, determine that a highest confidence score of the plurality of potential intents corresponds to a first potential intent associated with the skill, determine that the user profile does not have access to the skill, and select a second potential intent having a second confidence score lower than the first confidence score. Thus, if the user profile had access to the skill the server(s) 120 would select the first potential intent, but since the user profile does not have access the server(s) 120 may select the second potential intent instead.

In some examples, instead of restricting access to the skill by filtering potential intents, the server(s) 120 may enable access to the skill by adding potential intents associated with the skill to a top-level domain. For example, user profile(s) and/or account(s) that are given access to the skill and/or corresponding speechlet may be configured such that the speechlet is included as a top-level speechlet. Thus, a user may invoke a top-level speechlet without explicitly referring to the speechlet. For example, a weather speechlet may be a top-level speechlet and a user may say "Alexa, what is the weather" to invoke the weather speechlet.

Additionally or alternatively, the user profile(s) and/or account(s) that are given access to the skill and/or corresponding speechlet may be configured such that the speechlet is associated with the user profile and/or account but included as a non-top-level speechlet. Thus, a user may need to explicitly refer to a non-top-level speechlet in a user input in order to cause the system to call the particular non-top-level speechlet to perform an action responsive to the user input. For example, the user profile may be configured with a top-level weather speechlet and a non-top-level Weather Underground speechlet. To cause the non-top-level Weather Underground speechlet to be called instead of the top-level weather speechlet, a user may need to explicitly refer to the non-top-level Weather Underground speechlet, for example by saying "Alexa, ask Weather Underground what is the weather for tomorrow."

When user profile(s) and/or account(s) are not given access to the skill and/or corresponding speechlet, the speechlet is not associated with the user profile(s) and/or account(s) and the server(s) do not associate potential intents corresponding to the skill with the user profile. Thus, the user cannot invoke the skill even when explicitly referring to the speechlet.

While many of the examples described herein correspond to skills with two VUI components and/or skills that enable voice to voice communication between two separate devices, the disclosure is not limited thereto. Instead, the skill may include a single VUI component that enables voice to voice communication with a single device in a multi-turn or multi-stage interaction. To illustrate an example, the skill may correspond to a trivia game with scripted questions and answers, and the VUI component may enable user(s) to interact with the server(s) 120 during the trivia game. For example, the server(s) 120 may generate output audio data corresponding to a question, may receive input audio data responding to the question, and may generate output audio data indicating whether the answer was correct. The interaction between the server(s) 120 and the user may be customized based on the skill and/or speechlet, with the VUI component enabling voice interaction.

For ease of illustration, the following drawings and corresponding description are directed to the functionality provided by the server(s) 120, without mentioning specific programming used to implement the functionality. However, the functionality described below may be enabled by skills and/or speechlets that are programmed using these standardized components, such as the standardized VUI described above.

Figure 8A:
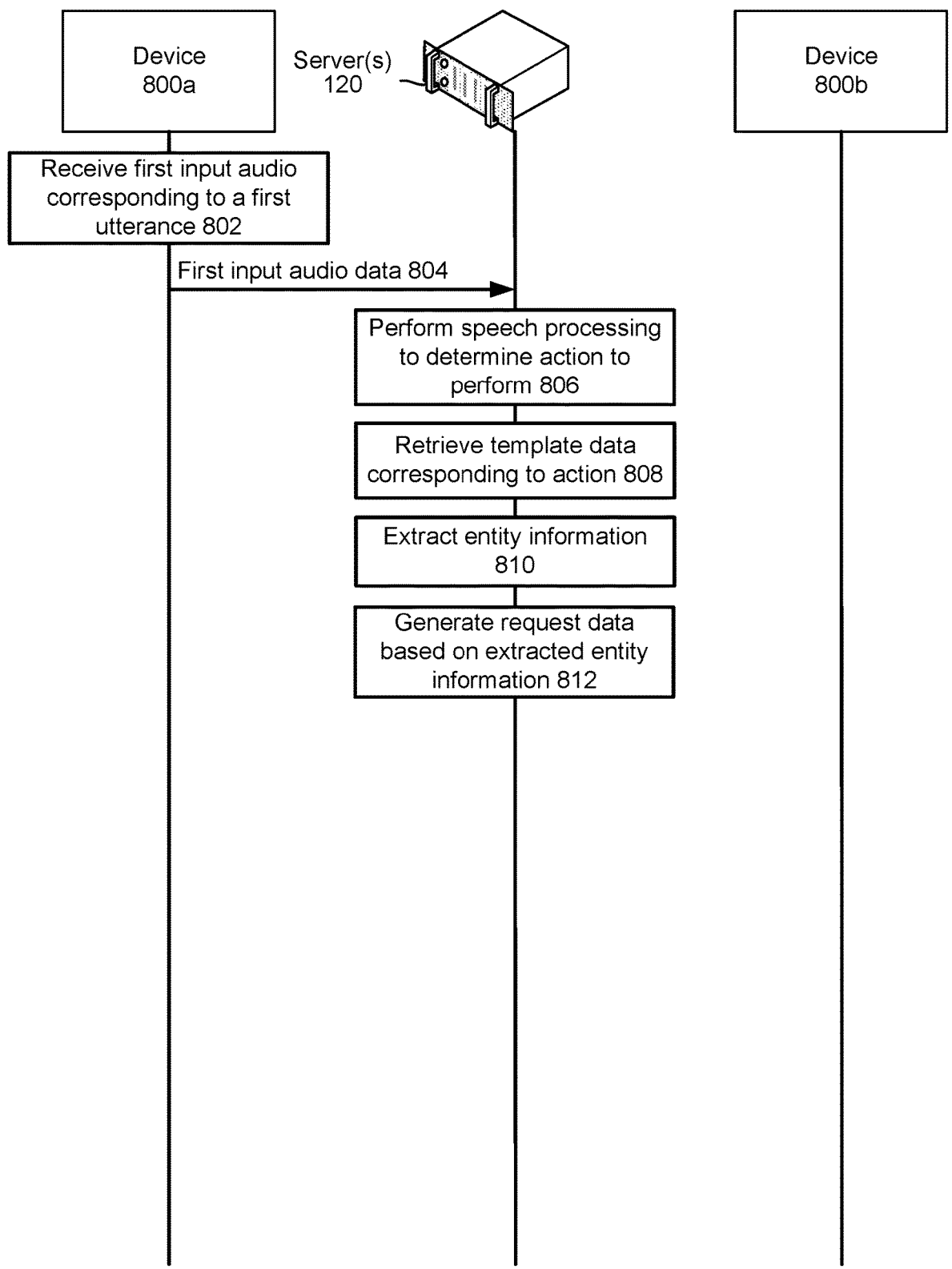
Figure 8E:
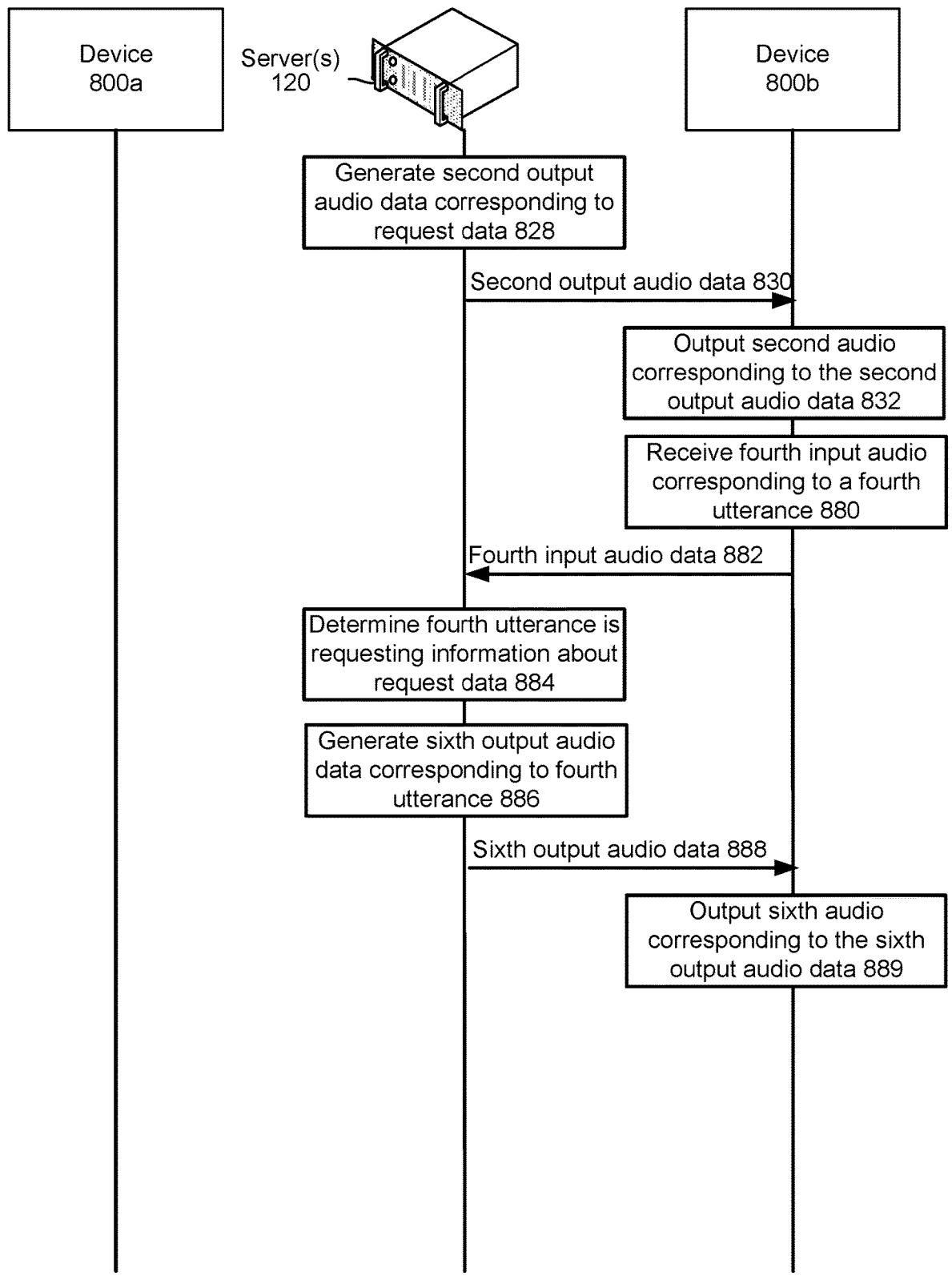

FIGS. 8A-8F are signal flow diagrams illustrating examples of processing speech and generating output audio during multi-stage interactions with two difference accounts according to embodiments of the present disclosure. FIGS. 8A-8F illustrate examples of different stages in a multi-stage voice interaction. For example, FIG. 8A illustrates a first stage corresponding to the server(s) 120 receiving input audio data from a first device 800a and processing the input audio data to extract entity information, FIG. 8B illustrates a potential second stage corresponding to the server(s) 120 determining that the request data is complete and generating output audio data, FIG. 8C illustrates a potential third stage corresponding to the server(s) 120 determining that the request data is incomplete and requesting additional information from the first device 800a, FIG. 8D illustrates a potential fourth stage corresponding to the server(s) 120 sending the request data to a second device 800b and forwarding audio data from the second device 800b to the first device 800a, FIG. 8E illustrates a potential fifth stage corresponding to the server(s) 120 providing additional information about the request data to the second device 800b, and FIG. 8F illustrates a potential sixth stage corresponding to the second device 800b requesting additional information about the request from the first device 800a.

While FIGS. 8A-8F illustrate potential stages in a particular order, the disclosure is not limited thereto and the order of the potential stages may vary without departing from the disclosure. Additionally or alternatively, a particular interaction may only include some of the potential stages without departing from the disclosure. For example, when no clarification or additional information is required, an entire interaction may correspond to the first stage illustrated in FIG. 8A and the potential second stage illustrated in FIG. 8B. In addition, a particular interaction may repeat potential stages multiple times without departing from the disclosure. For example, a particular interaction may repeat the potential third stage illustrated in FIG. 8C two or more times to request additional information that is necessary for the request data to be complete, and/or repeat the potential fifth stage illustrated in FIG. 8E two or more times to convey the request data to the second device 800b, without departing from the disclosure.

For ease of illustration, FIGS. 8A-8F illustrate interactions between the first device 800a and the second device 800b without indicating which device is associated with a customer or a business. Thus, the potential stages may correspond to customer initiated interactions or business initiated interactions without departing from the disclosure.

FIG. 8A illustrates a first stage corresponding to the server(s) 120 receiving input audio data from a first device 800a and processing the input audio data to extract entity information. As illustrated in FIG. 8A, the first device 800a may receive (802) first input audio corresponding to a first utterance and may send (804) first input audio data corresponding to the first input audio to the server(s) 120 for processing. For example, a first user 5a may provide the first device 800a with user input corresponding to speech (e.g., an utterance) and the first device 800a may generate the first input audio data representing the speech and send the first input audio data to the server(s) 120.

The server(s) 120 may perform (806) speech processing on the first input audio data to determine an action to perform. For example, the server(s) 120 may perform steps 706-710 illustrated in FIG. 7 to perform automatic speech recognition (ASR) processing on the first input audio data to generate first text data and then perform natural language understanding (NLU) processing on the first text data to determine an intent of a user command represented in the utterance of the input audio and/or an action to perform.

The server(s) 120 may retrieve (808) template data corresponding to the action. The template data may indicate all information required to complete the action and may be included in business profile data. Thus, the server(s) 120 may acquire business profile data and/or template data associated with the action and may use the business profile data and/or the template data to generate the request data. For example, the server(s) 120 may determine that the action corresponds to ordering from a restaurant, may identify the restaurant, and may retrieve template data and/or business profile data corresponding to the selected restaurant.

The server(s) 120 may extract (810) entity information from the first input audio data and generate (812) request data based on the extracted entity information. For example, the server(s) 120 may extract information from the first text data in order to generate request data corresponding to a request, such as a food order, hotel reservation or the like. Based on the template data, the server(s) 120 may identify what information is required to place the order and may extract the required information (e.g., entity information) from the first text data associated with the input audio data 111 and/or request additional information from the first user 5a.

The request data may include all details indicated by the input audio data 111 regarding the particular request. For example, if the input audio data 111 corresponds to placing an order at a restaurant, the request data may indicate a quantity and precise description of each menu item to order, along with customization options (e.g., modifications from the menu, specific side dishes, etc.) and any other details required to place the order. As another example, if the input audio data 111 corresponds to placing a reservation at a hotel, the request data may indicate a quantity and type of hotel room to reserve, along with specific dates, number of occupants, and/or other information required to reserve the hotel rooms. In addition, the request data may include information associated with the first user 5a, such as a name, address, phone number, and/or the like that may be used to place the order and/or make the reservation.

While the examples described above refer to placing an order at a restaurant or making a reservation at a hotel, the disclosure is not limited thereto and the request data may correspond to any information that may be processed by the server(s) 120 and sent to the second device 800b. For example, a customer (e.g., first user 5a) may place an order, make a hotel reservation, request information about services or products, request information about availability, and/or the like without departing from the disclosure. Additionally or alternatively, a business (e.g., second user 5b) may respond to a request for information from the first user 5a, may schedule and/or confirm appointments or meetings, may send reminders to the first user 5a, may advertise or provide quotes for services, and/or the like.

FIG. 8B illustrates a potential second stage corresponding to the server(s) 120 determining that the request data is complete and generating output audio data. As illustrated in FIG. 8B, the server(s) 120 may determine (820) that the request data is complete. For example, the server(s) 120 may compare the request data to the template data and determine that all information required to process the request that is indicated by the template data is present. However, the template data may only indicate a minimum amount of information necessary to process the request. To illustrate a first example that occurs when the first input audio data corresponds to placing an order at a restaurant, the server(s) 120 may determine that the request data is complete when the request data includes at least one menu item, a name, an address (e.g., if delivery is requested), a phone number, and/or any other information required to place the order. To illustrate a second example that occurs when the first input audio data corresponds to making a reservation at a hotel, the server(s) 120 may determine that the request data is complete when the request data includes at least a quantity of hotel rooms to reserve, specific dates for which to reserve the hotel rooms, a name, and/or any other information that may be used to make the reservation.

After determining that the request data is complete, the server(s) 120 may generate (822) first output audio data in response to the first utterance and send (824) the first output audio data to the first device 800a. For example, the first output audio data may indicate the action being performed (e.g., synthesized speech corresponding to "Okay, I will order from <Restaurant>"). In this example, the first device 800a may be associated with a first user 5a (e.g., customer) and the second device 800b may be associated with a business 20 to which the first user 5a is placing an order or making a reservation.

The server(s) 120 may also generate (828) second output audio data corresponding to the request data and may send (830) the second output audio data to the second device 800b associated with the business 20. For example, the second output audio data may correspond to a listing of the request data (e.g., synthesized speech corresponding to an entire order to be placed at the restaurant), a portion of the request data (e.g., synthesized speech corresponding to a single menu item from the order at a time, based on feedback received from the second device 800b), a notification of incoming request data (e.g., synthesized speech indicating an identification number associated with the request data, which the server(s) 120 may send directly to the second device 800b and/or other devices via the network(s) 199), and/or the like.

FIG. 8C illustrates a potential third stage corresponding to the server(s) 120 determining that the request data is incomplete and requesting additional information from the first device 800a. As illustrated in FIG. 8C, the server(s) 120 may determine (840) that request data is incomplete. The server(s) 120 may be configured to compare the request data to the template data associated with the action to perform and determine whether the request data is sufficient to perform the action. If the request data is insufficient to perform the action (e.g., necessary information is omitted or unknown to the server(s) 120), the server(s) 120 may determine that the request data is incomplete.

In some examples, as the template data may only indicate a minimum amount of information necessary to process the request, the server(s) 120 may request explicit confirmation from the first device 800a that the request data is complete. For example, the server(s) 120 may generate output audio data corresponding to synthesized speech (e.g., "Will that complete your order?") and receive input from the first device 800a (e.g., input audio data, although the disclosure is not limited thereto) that the request data is complete. However, the disclosure is not limited thereto and in other examples the server(s) 120 may determine that the request data is incomplete using other techniques known to one of skill in the art.

After determining that the request data is incomplete in step 840, the server(s) 120 may generate (842) third output audio data requesting additional information from the first device 800a and may send (844) the third output audio data to the first device 800a. The first device 800a may output (846) third audio corresponding to the third output audio data, may receive (848) second input audio corresponding to a second utterance (e.g., from the first user 5a) and may send (850) second input audio data to the server(s) 120. The server(s) 120 may then update (852) the request data based on the second utterance. For example, the server(s) 120 may generate third output audio data including synthesized speech corresponding to a clarification question (e.g., "What side dishes would you like?") and the second input audio data may correspond to a response (e.g., "I would like French fries"). Thus, the server(s) 120 may update the request data to include the additional information extracted from the response.

After updating the request data in step 852, the server(s) 120 may determine that the request data is complete and perform the steps illustrated in FIG. 8B or may determine that the request data is still incomplete and repeat the steps illustrated in FIG. 8C.

FIG. 8D illustrates a potential fourth stage corresponding to the server(s) 120 sending the request data to a second device 800b and forwarding audio data from the second device 800b to the first device 800a. For example, the potential fourth stage illustrated in FIG. 8D may correspond to placing an order at a restaurant, receiving confirmation of the order and any additional information (e.g., "Your order should be ready in 15 minutes"), and sending output audio data to the first device 800a indicating that the order was successfully placed along with the additional information.

As illustrated in FIG. 8D, the server(s) 120 may determine (860) that the first utterance is requesting information and may determine (862) that the requested information is not available to the server(s) 120. For example, the server(s) 120 may determine that the requested information is not included in the template data, the business profile data, or in any other data accessible to the server(s) 120. Therefore, the server(s) 120 may generate (864) fourth output audio data requesting the information and may send (866) the fourth output audio data to the second device 800*b*. The second device 800*b* may output (868) fourth audio corresponding to the fourth output audio data, may receive (870) third input audio corresponding to a third utterance, and may send (872) the third input audio data to the server(s) 120.

The server(s) 120 may generate (874) fifth output audio data responding to the request and may send (876) the fifth output audio data to the first device 800*a*, which may output (878) fifth audio corresponding to the fifth output audio data.

To illustrate an example, the first utterance may ask what side dishes come with a menu item and the server(s) 120 may be unable to determine the side dishes. Therefore, the server(s) 120 may send a request to the second device 800*b* for more information and receive clarification (e.g., "The side dishes are garlic mashed potatoes and asparagus") from the second device 800*b*. The server(s) 120 may then process the third input audio data and generate the fifth output audio data providing the clarification to the first device 800*a*. If the server(s) 120 receives additional input audio data from the first device 800*a*, the server(s) 120 may perform the steps illustrated in FIG. 8A to process the additional input audio data.

FIG. 8E illustrates a potential fifth stage corresponding to the server(s) 120 providing additional information about the request data to the second device 800*b*. In some examples the server(s) 120 may have an extended interaction with a second user 5*b* associated with the second device 800*b*. For example, the server(s) 120 may send output audio data to the second device 800*b*, receive input audio data from the second device 800*b*, send additional output audio data to the second device 800*b*, and so on. Thus, the server(s) 120 may communicate directly with the second user 5*b* associated with the second device 800*b* in a back and forth conversation, providing portions of the request data as prompted by the second user 5*b*. For example, the second user 5*b* may walk through an order one menu item at a time and the server(s) 120 may be configured to identify a relevant portion of the request data and generate output audio data indicating the requested menu item. Additionally or alternatively, the second user 5*b* may request clarification about the order and the server(s) 120 may be configured to respond to the request and provide additional information. For example, the server(s) 120 may interact with the second user 5*b* much like the first user 5*a* would if the first user 5*a* placed the order, listing each menu item, a quantity, and any customization options or other information one at a time.

As illustrated in FIG. 8E, the server(s) 120 may generate (828) second output audio data corresponding to the request data and send (830) the second output audio data to the second device 800*b*, which may output (832) the second audio corresponding to the second output audio data, as described above with regard to FIG. 8B.

The second device 800*b* may receive (880) fourth input audio corresponding to a fourth utterance and may send (882) fourth input audio data corresponding to the fourth input audio to the server(s) 120. The server(s) 120 may determine (884) that the fourth utterance is requesting information about the request data, may generate (886) sixth output audio data corresponding to the fourth utterance and may send (888) the sixth output audio data to the second device 800*b*, which may output (889) sixth audio corresponding to the sixth output audio data.

FIG. 8F illustrates a potential sixth stage corresponding to the second device 800*b* requesting additional information about the request from the first device 800*a*. For example, the second device 800*b* may request information that is unavailable to the server(s) 120, similar to the steps illustrated in FIG. 8D.

As illustrated in FIG. 8F, the second device 800*b* may receive (880) the fourth input audio corresponding to the fourth utterance, may send (882) the fourth input audio data corresponding to the fourth input audio to the server(s) 120, and the server(s) 120 may determine (884) that the fourth utterance is requesting information about the request data.

However, the server(s) 120 may determine (890) that the requested information is unknown, may generate (891) seventh output audio data requesting the information and may send (892) the seventh output audio data to the first device 800*a*. The first device 800*a* may output (893) seventh audio corresponding to the seventh output audio data, may receive (894) fifth input audio corresponding to a fifth utterance, and may send (895) fifth input audio data corresponding to the fifth input audio to the server(s) 120.

The server(s) 120 may update (896) the request data based on the fifth utterance, may generate (897) eighth output audio data corresponding to the fourth utterance, and may send (898) the eighth output audio data to the second device 800*b*, which may output (899) eighth audio corresponding to the eighth output audio data.

As discussed above, FIGS. 8A-8F illustrate examples of different stages in a multi-stage voice interaction, and the server(s) 120 may perform any combination of the steps illustrated in FIGS. 8A-8F without departing from the disclosure. In addition, the interactions illustrated in FIGS. 8A-8F may be associated with either a customer, a business, or a combination thereof, without departing from the disclosure. Thus, the potential stages may correspond to customer initiated interactions or business initiated interactions without departing from the disclosure.

While FIGS. 8A-8F illustrated the server(s) 120 sending output audio data to the second device 800*b* in order to convey the request data, the disclosure is not limited thereto. Instead, the server(s) 120 may convey the request data (e.g., an order, hotel reservation, etc.) using any techniques known to one of skill in the art. For example, the server(s) 120 may convey the request data by sending data to a device 22 via the data network(s) 199 (e.g., via email, text message, and/or other techniques for data transmission), by sending data to a smartphone 24 via the data network(s) 199 and/or cellular networks (e.g., via email, text message, and/or the like), by sending data to the device 22 and sending audio data to a telephone 26 (e.g., sending the request data to the device 22 and calling to confirm receipt of the request data via the telephone 26), by sending audio data to the telephone 26 (e.g., via a voice interaction), and/or the like.

While FIGS. 8E-8F illustrate examples of the second device 800*b* requesting information, the disclosure is not limited thereto and the second device 800*b* may include notifications or otherwise provide information to the server(s) 120 and/or the first device 800*a* without departing from the disclosure.

While FIGS. 8A-8F illustrate the server(s) 120 both receiving input audio data from and sending output audio data to the first device 800*a*, the disclosure is not limited thereto. In some examples, the first device 800*a* may send the input audio data to the server(s) 120 at a first time and receive the output audio data from the server(s) 120 at a second time. However, the disclosure is not limited thereto and the server(s) 120 may receive the input audio data from the first device 800*a* at the first time but send the output audio data to another device at the second time. For example, the first device 800*a* and another device may be associated with a user profile, and the server(s) 120 may determine which device to send the output audio data based on a location/presence of the user or the like. Thus, if the user is in proximity to the first device 800*a* at the second time, the server(s) 120 may send the output audio data to the first device 800*a*. However, if the user is not in proximity to the first device 800*a* at the second time, the server(s) 120 may send the output audio data to a different device that is in proximity to the user at the second time.

While FIGS. 8A-8F illustrate the server(s) 120 generating and sending output audio data to the first device 800*a* and/or the second device 800*b*, the disclosure is not limited thereto and the server(s) 120 may send data directly to the first device 800*a* and/or the second device 800*b* without departing from the disclosure.

Figure 9D:
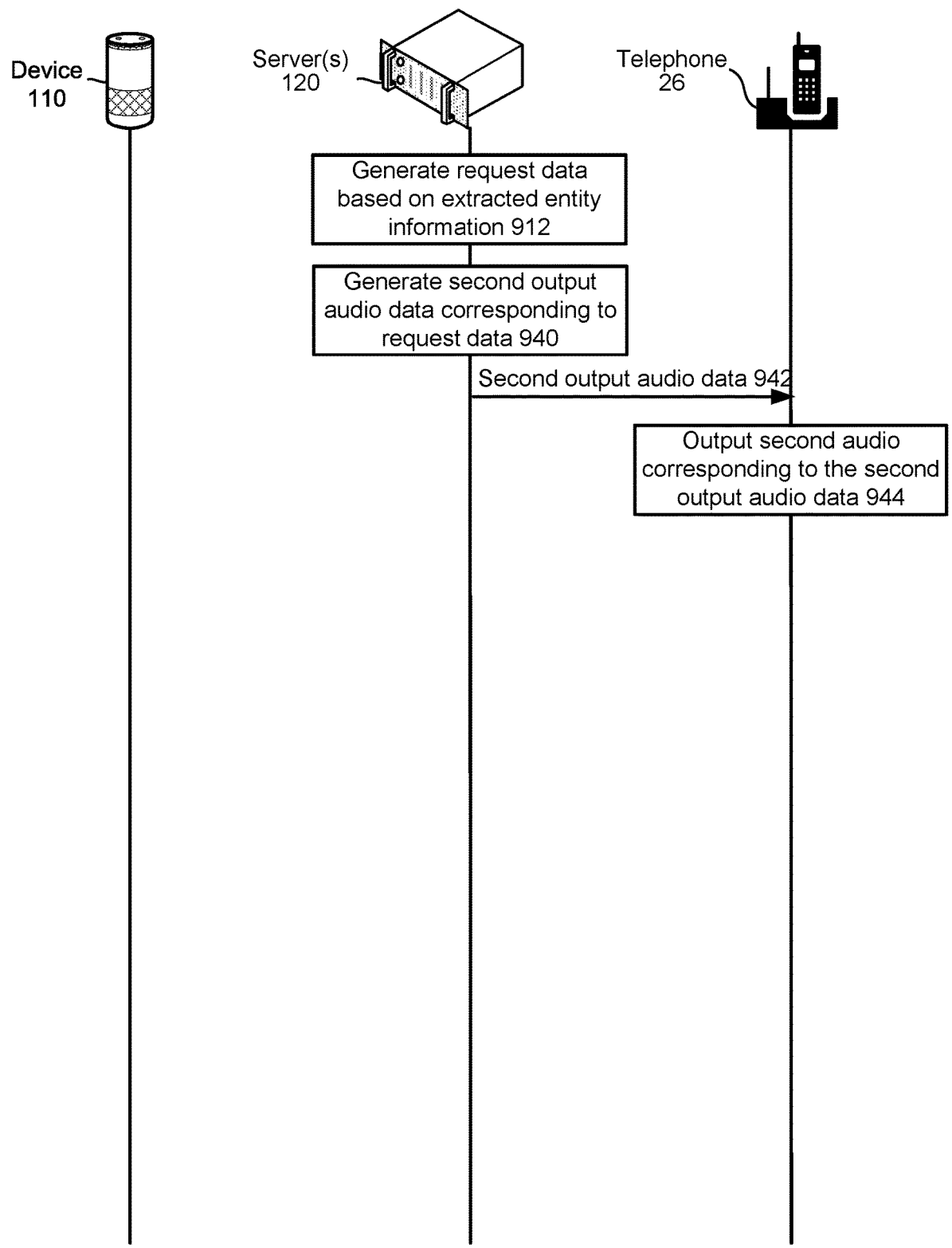

FIGS. 9A-9D are signal flow diagrams illustrating examples of sending data to a remote device according to embodiments of the present disclosure. FIG. 9A illustrates an example of the server(s) 120 conveying the request data by sending data to a device 22 via the data network(s) 199 (e.g., via email, text message, and/or other techniques for data transmission).

As illustrated in FIG. 9A, the device 110 may receive (902) first input audio corresponding to a first utterance and may send (904) first input audio data corresponding to the first input audio to the server(s) 120. The server(s) 120 may perform (906) speech processing on the first input audio data to determine an action to perform, may retrieve (908) template data corresponding to the action, may extract (910) entity information from the first input audio data, and may generate (912) request data based on the extracted entity information. The server(s) 120 may then send (914) the request data to the device 22 and the device 22 may display (916) the request data.

FIG. 9B illustrates an example of the server(s) 120 conveying the request data by sending data to a smartphone 24 via the data network(s) 199 and/or cellular networks (e.g., via email, text message, and/or the like). As illustrated in FIG. 9B, the device 110 may receive (902) the first input audio corresponding to a first utterance and may send (904) the first input audio data corresponding to the first input audio to the server(s) 120. The server(s) 120 may perform (906) speech processing on the first input audio data to determine the action to perform, may retrieve (908) template data corresponding to the action, may extract (910) the entity information from the first input audio data, and may generate (912) the request data based on the extracted entity information. The server(s) 120 may then send (920) the request data to the smartphone 24 via the data network(s) 199 and/or cellular networks and the smartphone 24 may display (922) the request data.

FIG. 9C illustrates an example of the server(s) 120 conveying the request data by sending data to the device 22 and sending audio data to a telephone 26 (e.g., sending the request data to the device 22 and calling to confirm receipt of the request data via the telephone 26). As illustrated in FIG. 9C, the server(s) 120 may perform steps 902-912 to generate (912) request data based on the extracted entity information. The server(s) 120 may then send (930) the request data to the device 22 and the device 22 may display (932) the request data. In addition, the server(s) 120 may generate (934) first output audio data corresponding to the request data and may send (936) the first output audio data to the telephone 26, which may output (938) first audio corresponding to the first output audio data. Thus, the business 20 may receive the request data on the device 22 while also receiving a telephone call confirming receipt of the request data, providing a notification of the request data, and/or the like.

FIG. 9D illustrates an example of the server(s) 120 conveying the request data by sending audio data to the telephone 26 (e.g., via a voice interaction), and/or the like. As illustrated in FIG. 9D, the server(s) 120 may perform steps 902-912 to generate (912) request data based on the extracted entity information. The server(s) 120 may then generate (940) second output audio data corresponding to the request data and may send (942) the second output audio data to the telephone 26, which may output (944) second audio corresponding to the second output audio data. While the first output audio data sent to the telephone 26 in step 936 may serve as a notification of the request data being sent to the device and/or confirmation of receipt of the request data by the device 22, the second output audio data sent to the telephone 26 in step 942 indicates all of the information included in the request data. Thus, the second output audio data is much more extensive than the first output audio data. While not illustrated in FIGS. 9C-9D, sending the first output audio data and/or the second output audio data may correspond to a multi-stage interaction, just like a normal conversation.

FIG. 10 is a signal flow diagram illustrating an example of collating data from multiple accounts and providing a summary according to embodiments of the present disclosure. The example illustrated in FIG. 10 may correspond to the first user 5*a* requesting information from multiple customers and/or businesses and the server(s) 120 collating the data to improve efficiency and/or a user experience by offloading work from the first user 5*a*. For example, the first user 5*a* associated with the device 110 may request information (e.g., price quotes) from multiple businesses (e.g., contractors, travel agents, and/or the like). Instead of having to interact with each business individually, the server(s) 120 may collect the information from each business and present the information to the first user 5*a* at the convenience of the first user 5*a*.

As illustrated in FIG. 10, a first telephone 26*a* may receive (1002) first input audio corresponding to a first utterance and may send (1004) first input audio data corresponding to the first input audio to the server(s) 120, and the server(s) 120 may generate (1006) request data based on the first utterance. Similarly, a second telephone 26*b* may receive (1008) second input audio corresponding to a second utterance and may send (1010) second input audio data corresponding to the second input audio to the server(s) 120, and the server(s) 120 may update 1012) the request data based on the second utterance.

After determining that the request data is complete, the server(s) 120 may generate (1014) first output audio data corresponding to the request data and may send (1016) the first output audio data to the device 110, which may output (1018) first audio corresponding to the first output audio data. Thus, the server(s) 120 may interact with multiple accounts and/or businesses on behalf of the first user 5*a* and provide a summary of the interactions and/or provided information (e.g., price quotes, requested information, etc.) to the first user 5*a*.

FIG. 11 is a signal flow diagram illustrating an example of requesting information from a second account on behalf of a first account according to embodiments of the present disclosure. While FIG. 11 is similar to FIGS. 8D and 8F described above, the previous drawings were illustrated as part of a multi-stage interaction. In contrast, FIG. 11 illustrates an example of a discrete interaction in which the request data corresponds to requesting information from the second device 800*b* (e.g., telephone 26).

As illustrated in FIG. 11, a device 110 may receive (1110) first input audio corresponding to the first utterance, may send (1112) first input audio data corresponding to the first input audio to the server(s) 120, and the server(s) 120 may determine (1114) that the first utterance is requesting information from a business 20.

The server(s) 120 may determine (1116) that the requested information is not available (e.g., unknown by the server(s) 120), may generate (1118) first output audio data requesting the information and may send (1120) the first output audio data to a telephone 26 associated with the business 20. For example, the server(s) 120 may determine the business 20 associated with the first utterance, may retrieve business profile data corresponding to the business 20, and may determine that the requested information is not included within the business profile data.

The telephone 26 may output (1122) first audio corresponding to the first output audio data, may receive (1124) second input audio corresponding to a second utterance, and may send (1126) second input audio data corresponding to the second input audio to the server(s) 120. The server(s) 120 may generate (1128) second output audio data corresponding to the second utterance and may send (1130) the second output audio data to the device 110, which may output (1132) second audio corresponding to the second output audio data.

Thus, a first user 5*a* associated with the device 110 may initiate a first voice interaction with the server(s) 120 to request information from a business 20, the server(s) 120 may initiate a second voice interaction with the business 20 to acquire the requested information from the business 20, and then the server(s) 120 may initiate a third voice interaction with the device 110 to present the requested information.

For ease of illustration, FIG. 11 illustrates each voice interaction as consisting of a single set of input audio data and output audio data. However, the disclosure is not limited thereto, and each voice interaction may consist of multiple sets of input audio data and output audio data without departing from the disclosure.

While FIG. 11 illustrates the server(s) 120 acquiring the requested information from a single business 20, the disclosure is not limited thereto and the server(s) 120 may acquire the requested information from two or more businesses 20 without departing from the disclosure. Additionally or alternatively, while the description of FIG. 11 describes a customer (e.g., first user 5*a* associated with the device 110) requesting information from a business 20, the disclosure is not limited thereto and the customer, a user, or a business 20 may request information from a combination of user(s), customer(s), and/or one or more businesses 20 without departing from the disclosure.

To illustrate an example of a user requesting information from other users, the first user 5*a* may request information from multiple other users 5 in order to plan a party. For example, the first user 5*a* may request availability to schedule the party, may request an RSVP to confirm attendance and a number of guests at the party, may request information about items needed for the party (e.g., high chairs, special dietary considerations, etc.), may request information about items being provided for the party (e.g., food, drink, tables, plates, silverware, etc.), and/or the like. Thus, the server(s) 120 may offload the party planning from the first user 5*a* and simplify interactions between the first user 5*a* and the other users 5 attending the party.

While FIG. 11 illustrates an example of a first account (e.g., first user profile) using the server(s) 120 to request information from a second account (e.g., second user profile), the first account may use the server(s) 120 to transmit notifications or other information to multiple accounts. In some examples, the server(s) 120 may transmit identical notifications to each of the multiple accounts, although the disclosure is not limited thereto. Instead, the server(s) 120 may extract information and send personalized notifications or other information to each of the multiple accounts without departing from the disclosure.

FIGS. 12A-12B are signal flow diagrams illustrating examples of sending data to one or more accounts on behalf of a first account according to embodiments of the present disclosure. FIG. 12A illustrates a first example of sending notifications to multiple accounts, whereas FIG. 12B illustrates a second example of initiating a voice interaction to send a notification and provide additional functionality, such as scheduling or confirming an appointment or meeting.

As illustrated in FIG. 12A, a business 20 may generate (1202) request data associated with account(s) and send (1204) the request data to the server(s) 120. While FIG. 12A illustrates the business 20 generating request data associated with multiple accounts, the disclosure is not limited thereto and the business 20 may generate request data associated with only a single account without departing from the disclosure. Examples of the request data may include a calendar of meetings or appointments, information about products or services offered by the business 20, and/or any data associated with sending notifications, reminders, requests, and/or the like.

The server(s) 120 may generate (1206) first output data corresponding to a first account and may send (1208) the first output data to a first smartphone 24*a* associated with the first account, and the first smartphone 24*a* may output (1210) the first output data.

The server(s) 120 may generate (1212) second output data corresponding to a second account and may send (1214) the second output data to a second smartphone 24*b* associated with the second account, and the second smartphone 24*b* may output (1216) the second output data.

The server(s) 120 may generate (1218) third output data corresponding to a third account and may send (1220) the third output data to a device 22 associated with the third account, and the device 22 may output (1222) the third output data.

While not illustrated in FIG. 12A, the server(s) 120 may receive input data from one or more accounts in response to sending the output data. For example, one or more of the first smartphone 24*a*, the second smartphone 24*b*, and/or the device 22 may send input data responding to the output data sent from the server(s) 120, such as confirmation of an upcoming appointment or meeting, indication of requested information, and/or the like.

The server(s) 120 may generate (1224) summary data and may send (1226) the summary data to the business 20. The summary data may indicate what output data was sent, one or accounts to which the output data was sent, input received from the one or more accounts in response to the output data, and/or the like. While not illustrated in FIG. 12A, the server(s) 120 may generate summary audio data based on the summary data and may send the summary audio data to the business 20 without departing from the disclosure.

While FIG. 12A illustrates the server(s) 120 sending output data to only a single device for each account, the disclosure is not limited thereto and the server(s) 120 may send the output data to multiple devices without departing from the disclosure. Additionally or alternatively, while FIG. 12A illustrates the server(s) 120 sending output data to a smartphone 24a and a device 22, the disclosure is not limited thereto and the server(s) 120 may send output data to a telephone 26 and/or a device 110 without departing from the disclosure. In some examples, the server(s) 120 may generate audio data from the output data and may initiate a voice interaction with the smartphone 24, the telephone 26, and/or the device 110 associated with an account.

FIG. 12B illustrates an example of initiating a voice interaction to send a notification and/or provide additional functionality, such as scheduling or confirming an appointment or meeting. As illustrated in FIG. 12B, the server(s) 120 may generate (1206) the first output data illustrated in FIG. 12A and then may perform (1250) text-to-speech (TTS) processing on the output data to generate first output audio data and may send (1252) the first output audio data to the first smartphone 24a. The first smartphone 24a may output (1254) first audio corresponding to the first output audio data, may receive (1256) first input audio corresponding to a first utterance, and may send (1258) first input audio data corresponding to the first input audio to the server(s) 120.

The server(s) 120 may determine (1260) an action to take in response to the first utterance, may generate (1262) second output audio data in response to the first utterance, and may send (1264) the second output audio data to the first smartphone 24a, which may output (1266) second audio corresponding to the second output audio data. For example, the server(s) 120 may determine that the first utterance is confirming an appointment and may generate the second output audio data to indicate to a user of the first smartphone 24a that the appointment has been confirmed.

The server(s) 120 may then generate (1268) third output audio data and may send (1270) the third output audio data to a business 20, which may output (1272) third audio corresponding to the third output audio data. For example, the server(s) 120 may call a telephone 26 associated with the business 20 and initiate a voice interaction to notify the business that the account has confirmed the scheduled appointment. However, the disclosure is not limited thereto and the server(s) 120 may send output data to the business 20 via a device 22, a smartphone 24, a device 110, and/or any other device without departing from the disclosure.

FIG. 13 is a signal flow diagram illustrating an example of supplementing request data with information based on user preferences according to embodiments of the present disclosure. As illustrated n FIG. 13, a device 110 may receive (1302) first input audio corresponding to a first utterance and may send (1304) first input audio data corresponding to the first input audio to the server(s) 120. The server(s) 120 may extract (1306) entity information from the first input audio data, and may generate (1308) request data based on the extracted entity information.

In some examples, the server(s) 120 may supplement the request data based on user preferences, historical data, previous interactions, and/or the like associated with a user profile and/or account. As illustrated n FIG. 13, the server(s) 120 may request (1310) user profile data from profile storage 270, may receive (1312) the user profile data 1312 from the profile storage 270, and may update (1314) the request data based on the user profile data.

To illustrate an example, a first user 5a associated with the device 110 may input speech corresponding to the first utterance (e.g., "Alexa, order a barbecue chicken pizza"). The server(s) 120 may determine a user profile associated with the first user 5a and/or the device 110, may request user profile data corresponding to the user profile, and may update the request data based on the received user profile data. For example, the user profile data may indicate that the first user 5a frequently orders a large barbecue chicken pizza without peppers or onions from a particular restaurant. Therefore, the server(s) 120 may update the request data to indicate the particular restaurant, that the pizza should be a large, and that there should be no peppers or onions. Thus, the server(s) 120 personalize the request data based on the user profile, without the first user 5a having to specify these details in the first utterance.

The server(s) 120 may update the request data based on additional information included within the user profile data without departing from the disclosure. For example, the server(s) 120 may determine that the device 110 is associated with a first location, whereas the first user 5a typically orders pizza from a second location. Therefore, the server(s) 120 may determine that the particular restaurant from which the first user 5a typically orders is not associated with the first location and the server(s) 120 may provide a list of local restaurants to the device 110 to output to the first user 5a.

While the examples described above are associated with a simple illustration of personalizing an order for a pizza, one of skill in the art will recognize that the concepts may apply to any information associated with a user profile and/or stored in user profile data. For example, the server(s) 120 may supplement request data associated with any request based on previous activity, user preferences, and/or the like.

In some examples, the server(s) 120 may use recent information (e.g., recent meetings/appointments, upcoming meetings/appointments, recent communications such as email, phone calls, or texts, etc.) associated with the user profile to supplement the request data. For example, if the first utterance corresponds to a request to email a client, the server(s) 120 may determine that an upcoming meeting is scheduled with the client and may supplement the request data with information associated with the upcoming meeting. In some examples, the server(s) 120 may request confirmation before updating the request data, in order to ensure that the potential information is relevant to the request data.

In some examples, the server(s) 120 may automatically update the request data based on the user profile data. However, the disclosure is not limited thereto and in examples, the server(s) 120 may request confirmation from the device 110 prior to updating the request data based on the user profile data. For example, while automatically updating the request data may potentially provide convenience to the user, requesting confirmation may increase a likelihood that the user's request is satisfied. In some examples, the server(s) 120 may determine whether to request confirmation based on a confidence score threshold or the like.

Figure 14:
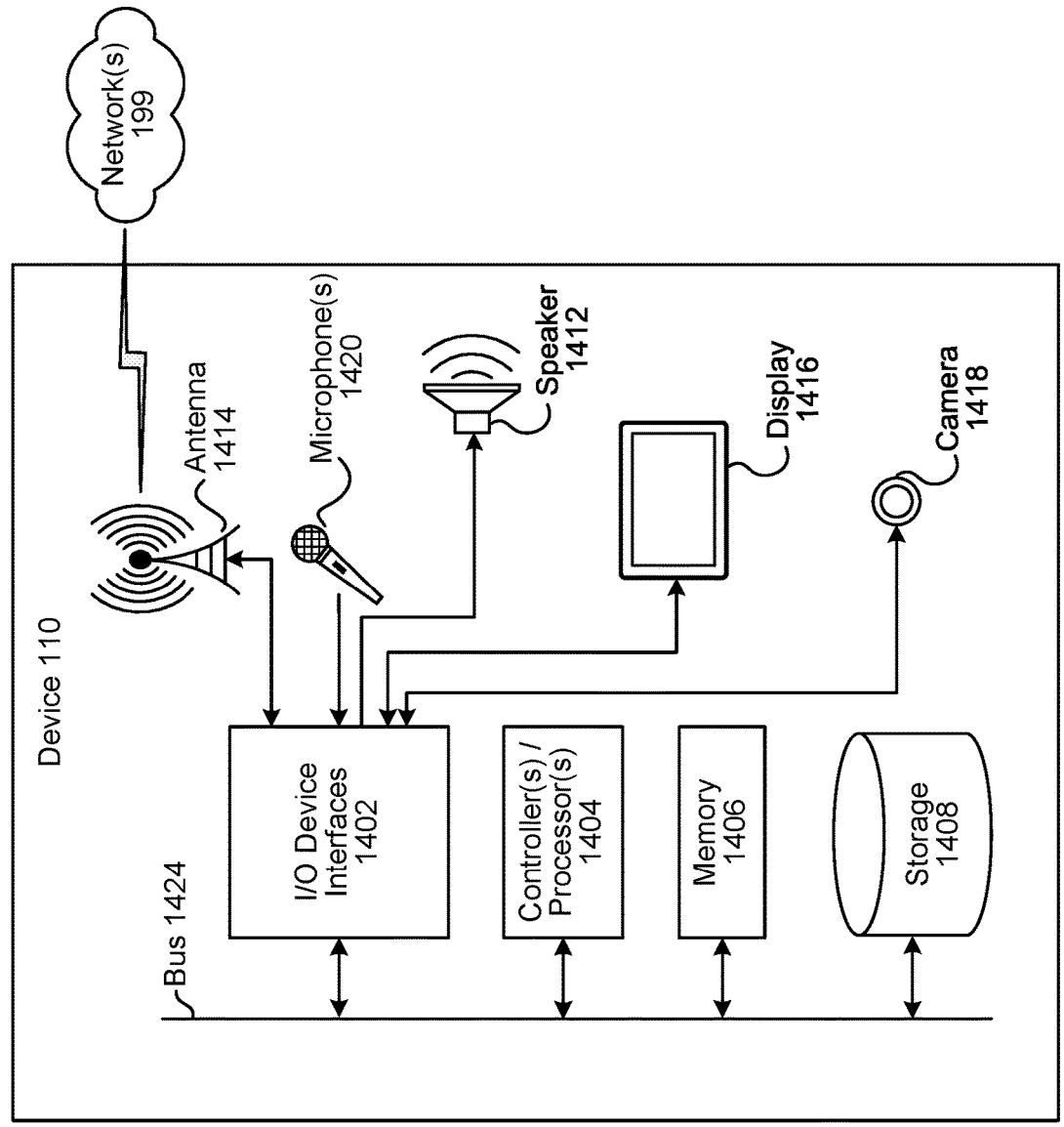
FIG. 14 is a block diagram conceptually illustrating example components of a device according to embodiments of the present disclosure.
Figure 15:
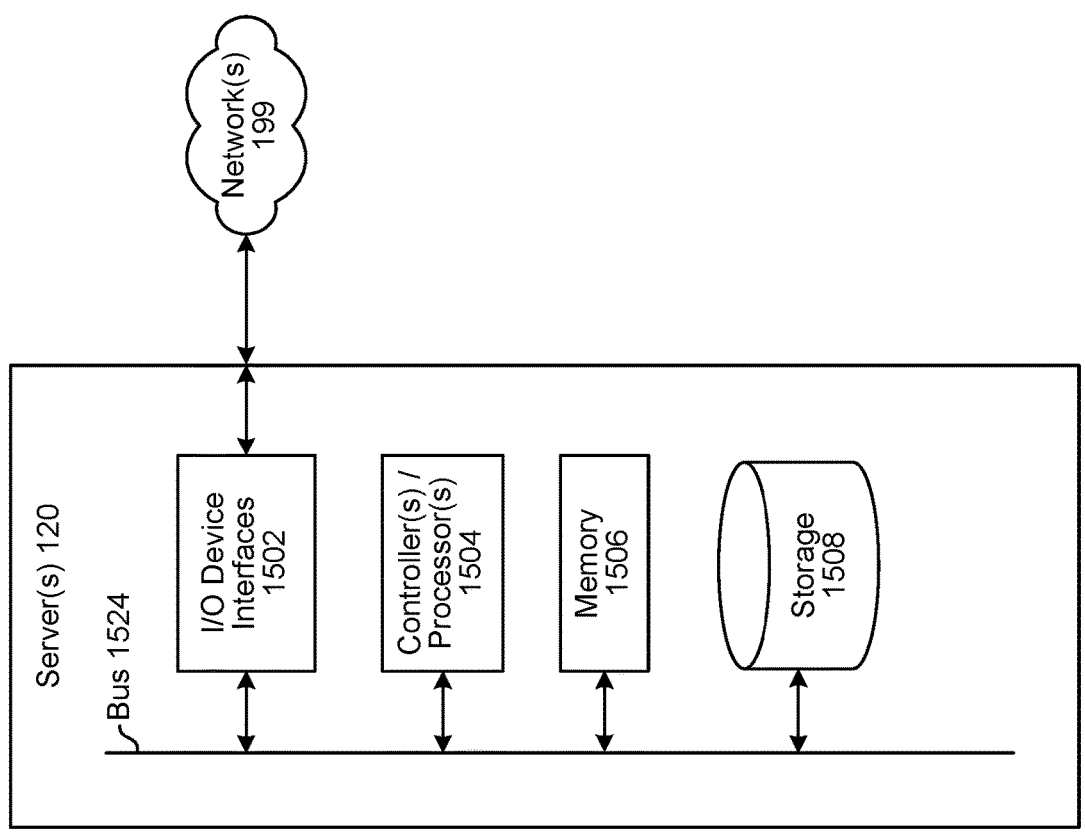
FIG. 15 is a block diagram conceptually illustrating example components of a server according to embodiments of the present disclosure.

FIG. 14 is a block diagram conceptually illustrating a device 110 that may be used with the system. FIG. 15 is a block diagram conceptually illustrating example components of a remote device, such as the server(s) 120, which may assist with ASR processing, NLU processing, etc. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers 120 may be included in the system, such as one or more servers 120 for performing ASR processing, one or more servers 120 for performing NLU processing, etc. In operation, each of these devices (or groups of devices) may include computer-readable and computer-executable instructions that reside on the respective device (110/120), as will be discussed further below.

Each of these devices (110/120) may include one or more controllers/processors (1404/1504), which may each include a central processing unit (CPU) for processing data and computer-readable instructions, and a memory (1406/1506) for storing data and instructions of the respective device. The memories (1406/1506) may individually include volatile random access memory (RAM), non-volatile read only memory (ROM), non-volatile magnetoresistive memory (MRAM), and/or other types of memory. Each device (110/120) may also include a data storage component (1408/1508) for storing data and controller/processor-executable instructions. Each data storage component (1408/1508) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1402/1502).

Computer instructions for operating each device (110/120) and its various components may be executed by the respective device's controller(s)/processor(s) (1404/1504), using the memory (1406/1506) as temporary "working" storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device in addition to or instead of software.

Each device (110/120) includes input/output device interfaces (1402/1502). A variety of components may be connected through the input/output device interfaces (1402/1502), as will be discussed further below. Additionally, each device (110/120) may include an address/data bus (1424/1524) for conveying data among components of the respective device. Each component within a device (110/120) may also be directly connected to other components in addition to (or instead of) being connected to other components across the bus (1424/1524).

Referring to FIG. 14, the device 110 may include input/output device interfaces 1402 that connect to a variety of components such as an audio output component such as a speaker 1412, a wired headset or a wireless headset (not illustrated), or other component capable of outputting audio. The device 110 may also include an audio capture component. The audio capture component may be, for example, a microphone 1420 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1416 for displaying content. The device 110 may further include a camera 1418.

Via antenna(s) 1414, the input/output device interfaces 1402 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1402/1502) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (1402/1502), processor(s) (1404/1504), memory (1406/1506), and/or storage (1408/1508) of the device(s) 110 and server(s) 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are illustrative, and may be located as a stand-alone device or may be included, in whole or in part, as a component of a larger device or system.

Figure 16:
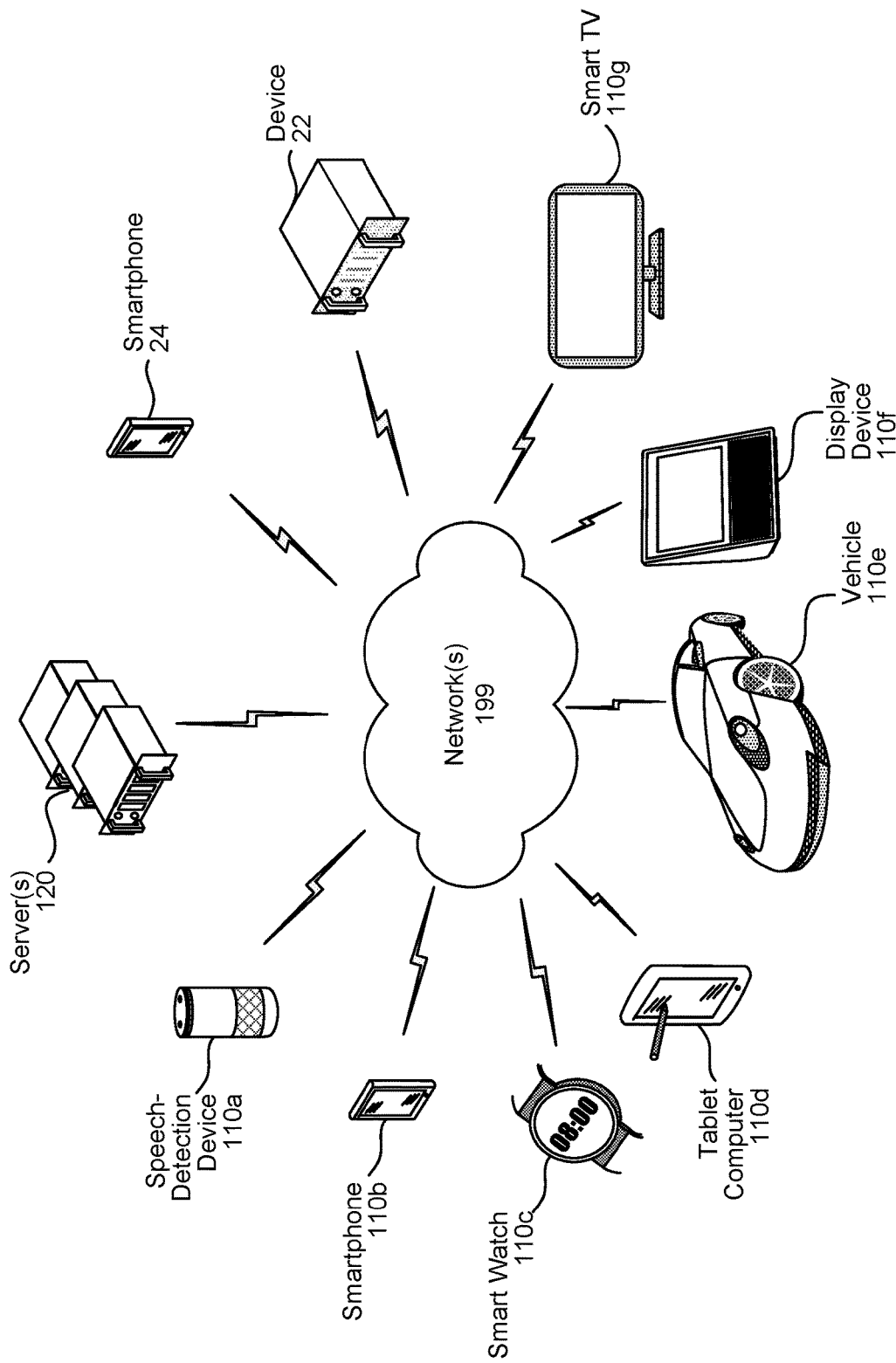
FIG. 16 illustrates an example of a computer network for use with the speech processing system.

As illustrated in FIG. 16, multiple devices (110*a*-110*g*, 120, 22, 24) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a display device 110*f*, smart television 110*g*, and/or remote devices (e.g., a device 22, smartphone 24, telephone 26, etc., which may be associated with a business 20 or a user 5) may be connected to the network(s) 199 through a wireless service provider, over a WiFi or cellular network connection, via an adapter from a public switched telephone network (PSTN), and/or the like. For example, the server(s) 120 may communicate with the device 22 via the data network(s) 199, communicate with the smartphone 24 via a combination of the data network(s) 199 and/or the cellular network connection, and communicate with the telephone 26 via a combination of the data network(s) 199 and/or the PSTN using an adapter.

Other devices are included as network-connected support devices, such as the server(s) 120, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a first device, first input audio data corresponding to a first utterance;
   performing speech processing using the first input audio data to determine first intent data;
   determining first data is needed to execute a first action corresponding to the first intent data;
   determining second data corresponding to a request for the first data;
   sending the second data to the first device;
   performing processing with regard to the first intent data to determine first output data;
   storing the first output data;
   after storing the first output data, receiving, from a second device, second input audio data corresponding to a second utterance;
   performing speech processing using the second input audio data and the first output data to determine second intent data;
   performing processing with regard to the second intent data to determine second output data;
   performing speech synthesis using the second output data to determine output audio data responsive to the second utterance; and
   sending the output audio data to the second device for output.

2. The computer-implemented method of claim 1, wherein:
   the second data comprises audio data; and
   the method further comprises performing speech synthesis to determine the second data.

3. The computer-implemented method of claim 2, further comprising:
   receiving third input audio data corresponding to a response to the second data; and
   performing speech processing using the third input audio data to determine the first data,
   wherein the first output data is based at least in part on the first data.

4. The computer-implemented method of claim 1, further comprising:
   determining entity data corresponding to the first intent data,
   wherein the first output data is based at least in part on the entity data.

5. The computer-implemented method of claim 1, wherein:
   the first device is associated with a first profile; and
   the second device is associated with the first profile.

6. The computer-implemented method of claim 1, wherein:
   the first output data is associated with a first profile; and
   the method further comprises:
       determining third data is needed to execute a second action corresponding to the second intent data;
       determining fourth data corresponding to a request for the third data;
       based at least in part on the first profile, determining a recipient device for the fourth data; and
       sending the fourth data to the recipient device.

7. The computer-implemented method of claim 1, wherein:
the first output data is associated with a first profile; and
the method further comprises:
determining third data is needed to execute a second action corresponding to the second intent data;
based at least in part on the first profile, determining fourth data corresponding to a request for the third data; and
sending the fourth data to the second device.

8. The computer-implemented method of claim 1, wherein performing speech processing using the second input audio data and the first output data comprises performing natural language understanding processing using at least the first output data.

9. The computer-implemented method of claim 1, wherein:
the first device corresponds to a first profile;
the first profile corresponds to an enabled speechlet component; and
the second intent data corresponds to the enabled speechlet component.

10. A system comprising:
at least one processor; and
at least one memory comprising instructions that, when executed by the at least one processor, cause the system to:
receive, from a first device, first input audio data corresponding to a first utterance;
perform speech processing using the first input audio data to determine first intent data;
determine first data is needed to execute a first action corresponding to the first intent data;
determine second data corresponding to a request for the first data;
send the second data to the first device;
perform processing with regard to the first intent data to determine first output data;
store the first output data;
after storing the first output data, receive, from a second device, second input audio data corresponding to a second utterance;
perform speech processing using the second input audio data and the first output data to determine second intent data;
perform processing with regard to the second intent data to determine second output data;
perform speech synthesis using the second output data to determine output audio data responsive to the second utterance; and
send the output audio data to the second device for output.

11. The system of claim 10, wherein:
the second data comprises audio data; and
the at least one memory further comprises instructions that, when executed by the at least one processor, further cause the system to perform speech synthesis to determine the second data.

12. The system of claim 10, wherein the at least one memory further comprises instructions that, when executed by the at least one processor, further cause the system to:
receive third input audio data corresponding to a response to the second data; and
perform speech processing using the third input audio data to determine the first data,
wherein the first output data is based at least in part on the first data.

13. The system of claim 10, wherein the at least one memory further comprises instructions that, when executed by the at least one processor, further cause the system to:
determine entity data corresponding to the first intent data,
wherein the first output data is based at least in part on the entity data.

14. The system of claim 10, wherein:
the first device is associated with a first profile; and
the second device is associated with the first profile.

15. The system of claim 10, wherein:
the first output data is associated with a first profile; and
wherein the at least one memory further comprises instructions that, when executed by the at least one processor, further cause the system to:
determine third data is needed to execute a second action corresponding to the second intent data;
determine fourth data corresponding to a request for the third data;
based at least in part on the first profile, determine a recipient device for the fourth data; and
send the fourth data to the recipient device.

16. The system of claim 10, wherein:
the first output data is associated with a first profile; and
wherein the at least one memory further comprises instructions that, when executed by the at least one processor, further cause the system to:
determine third data is needed to execute a second action corresponding to the second intent data;
based at least in part on the first profile, determine fourth data corresponding to a request for the third data; and
send the fourth data to the second device.

17. The system of claim 10, wherein the instructions that cause the system to perform speech processing using the second input audio data and the first output data comprise instructions that, when executed by the at least one processor, further cause the system to perform natural language understanding processing using at least the first output data.

18. The system of claim 10, wherein:
the first device corresponds to a first profile;
the first profile corresponds to an enabled speechlet component; and
the second intent data corresponds to the enabled speechlet component.

* * * * *